(12) United States Patent
Newman et al.

(10) Patent No.: US 10,997,693 B2
(45) Date of Patent: May 4, 2021

(54) APPARATUS AND METHODS FOR NON-UNIFORM PROCESSING OF IMAGE DATA

(71) Applicant: GoPro, Inc., San Mateo, CA (US)

(72) Inventors: David Newman, San Diego, CA (US); Cesar Douady, San Diego, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 16/503,336

(22) Filed: Jul. 3, 2019

(65) Prior Publication Data
US 2021/0004932 A1  Jan. 7, 2021

(51) Int. Cl.
*G06T 3/40* (2006.01)
*G06T 3/00* (2006.01)
*H04N 13/178* (2018.01)
*H04N 13/156* (2018.01)

(52) U.S. Cl.
CPC .......... *G06T 3/4038* (2013.01); *G06T 3/0087* (2013.01); *H04N 13/156* (2018.05); *H04N 13/178* (2018.05)

(58) Field of Classification Search
CPC ... G06T 3/4038; G06T 3/0087; H04N 13/178; H04N 13/156
See application file for complete search history.

(56) References Cited

U.S. PATENT DOCUMENTS

| | | | |
|---|---|---|---|
| 10,217,488 B1* | 2/2019 | Huang | H04N 5/232 |
| 2011/0013701 A1* | 1/2011 | Henocq | H04N 19/89 |
| | | | 375/240.25 |
| 2015/0116691 A1* | 4/2015 | Likholyot | G01C 15/002 |
| | | | 356/4.01 |
| 2016/0119541 A1* | 4/2016 | Alvarado-Moya | |
| | | | H04N 5/2256 |
| | | | 348/38 |
| 2018/0061002 A1* | 3/2018 | Lee | H04N 19/597 |
| 2018/0174619 A1* | 6/2018 | Roy | H04N 13/00 |
| 2018/0240276 A1* | 8/2018 | He | G06T 3/0087 |
| 2018/0288363 A1* | 10/2018 | Amengual Galdon | |
| | | | H04N 19/40 |
| 2018/0324457 A1* | 11/2018 | Murata | H04N 19/137 |
| 2018/0343470 A1* | 11/2018 | Schmit | H04N 19/593 |
| 2018/0343472 A1* | 11/2018 | Wang | H04N 21/85406 |
| 2019/0222862 A1* | 7/2019 | Shin | H04N 19/563 |

* cited by examiner

*Primary Examiner* — Joseph Suh
(74) *Attorney, Agent, or Firm* — Esplin & Associates, PC

(57) ABSTRACT

Methods and apparatus for processing of high resolution content so as to obey desired encoder constraints. In one embodiment, the method includes capturing high resolution imaging spherical content; mapping the spherical content to another frame of reference (e.g., a non-uniform mapping and scaling) splitting up the mapped and scaled content into respective portions; feeding the split up portions to respective imaging encoders; packing encoded content from the respective imaging encoders into an A/V container; and storing and/or transmitting the A/V container. In one variant, the mapping and scaling are chosen to enable rendering of 1080P content in a desired scope or range (e.g., 360 degrees) using commodity encoder hardware and software.

21 Claims, 16 Drawing Sheets

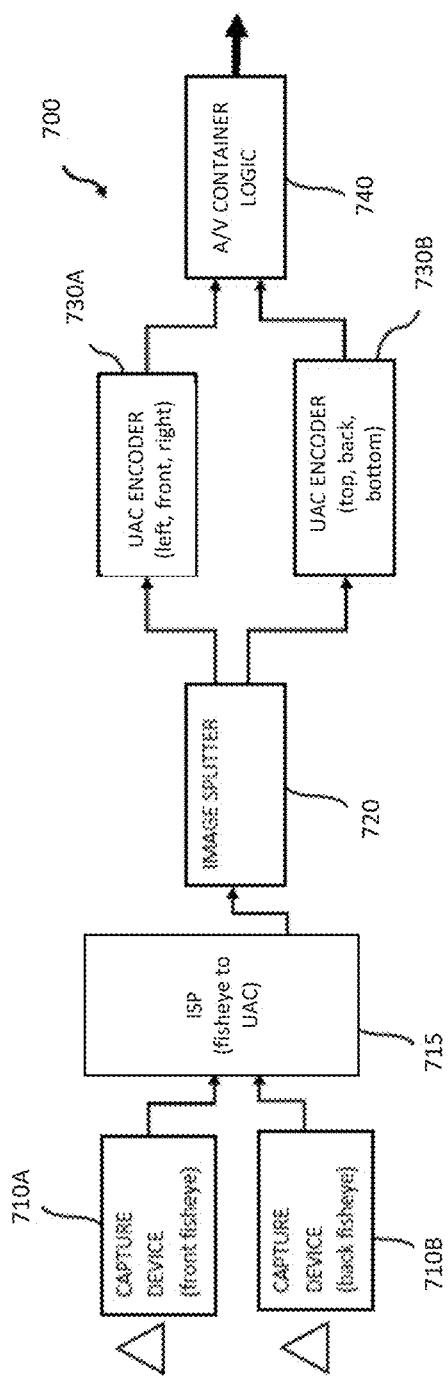
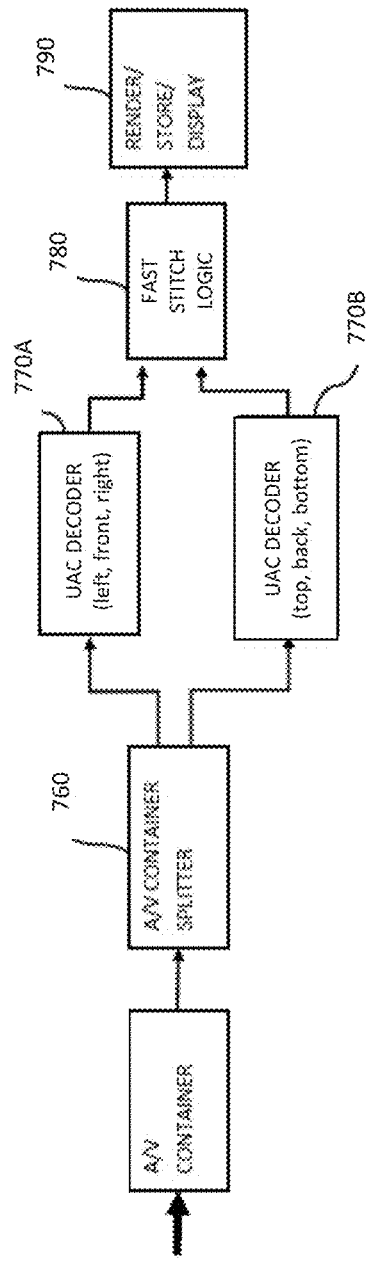
FIG. 8A
FIG. 8B

APPARATUS AND METHODS FOR NON-UNIFORM PROCESSING OF IMAGE DATA

RELATED APPLICATIONS

The subject matter of this case is related to that of co-owned and co-pending U.S. patent application Ser. No. 16/235,866 filed Dec. 28, 2018 and entitled "Apparatus and Methods for Non-Uniform Downsampling of Captured Panoramic Images", which is incorporated herein by reference in its entirety. The subject matter of this case is also related to that of co-owned and co-pending U.S. patent application Ser. No. 16/234,396 filed Dec. 27, 2018 and entitled "Methods and Apparatus for Multi-Encoder Processing of High Resolution Content", the which is are also incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to video image processing and in one exemplary aspect, to methods and apparatus for the non-uniform processing of captured panoramic images.

Description of Related Art

Imaging sensors, such as imaging sensors contained within image capture devices such as the GoPro Hero™ or Fusion™ families of devices manufactured by the Assignee hereof, may natively capture imaging content (e.g., still images, video content, panoramic content) at a resolution and frame rate that is incompatible with many extant imaging codecs contained within many common computing devices (such as smart phones). Accordingly, many types of captured imaging content may not be processed at their natively captured resolutions and/or at their natively captured bit rates (e.g., frame rates). Furthermore, captured imaging content having non-traditional (e.g., fisheye) format or polynomial has non-uniform information density. For example, as illustrated in FIG. 1, some exemplary GoPro lenses capture image data with a higher image density near their central fields of view, and a lower image density towards the peripheral fields of view. For example, pixels are in one scheme uniformly downsampled at 2880/4000 (i.e., 18/25) over the entire image as shown. Such uniform scaling (downsampling) and encoding of such natively captured images means that image resolution is lost. Note that as shown in FIG. 1, K/a (information density) experiences a slight degradation (fewer pixels per area), but the shape of the distribution remains the same.

FIG. 2 illustrates one approach of using two fisheye lenses in a back-to-back configuration to generate a spherical image. As shown, each lens covers more than a hemisphere (e.g., on the order of 190 degrees), and image data generated from sensors having these lenses may be put in so-called "EAC" (equi-angular cubemap) format, such as is described in co-owned and co-pending U.S. patent application Ser. No. 16/234,396 filed Dec. 27, 2018 and entitled "Methods and Apparatus for Multi-Encoder Processing of High Resolution Content," previously incorporated herein.

Some EAC formats assume that the sides of the EAC each have uniform image information density, and hence allocate an equal number of pixels accordingly. Unfortunately, the captured images from such lenses do not have uniform information density (see discussion of FIG. 1 above).

A further consideration relates to the extant ecosystem of hardware and software with which the captured image data will ultimately be utilized. For instance, the known High Efficiency Video Coding (HEVC) codec may be selected as a target codec broadly available within user's ecosystems. As a brief aside, existing video codec (encoding/decoding) infrastructure is standardized such that the various participants of the ecosystem (e.g., manufacturers, component vendors, customers, etc.) can interact without interoperability issues. For example, a High Efficiency Video Coding (HEVC) standard (also known as H.265 and/or MPEG-H Part 2 (Motion Picture Experts Group)) promulgates specific requirements for e.g., audio/visual (A/V) formats and data structures. Once the specific A/V formats have been published, codec manufacturers can create codecs that support the promulgated standards. In parallel, software developers can write software for applications with confidence that their applications will correctly function in the newly designed hardware.

The aforementioned HEVC standard provides significantly better data compression at the same level of video quality over its predecessor (H.264), and supports resolutions up to 8192×4320, including 8K UHD. Different "levels" with HEVC exist, corresponding to different maximum resolutions. For example, an HEVC Level 5.2 codec formats have a maximum resolution of 4096×2160 (or "4K").

The capabilities and ubiquity of the target codec(s) of the user's ecosystem are also an important factor in image data processing by such cameras. As but one example, an area of significant commercial interest is spherical video photography. One spherical viewing format (made popular by the Assignee hereof) represents 120° of viewing angle as a 1920×1080 (more commonly referred to as "1080p"). Even though a Level 6 HEVC codec can support much larger video formats (up to 8196×4320 or "8K"), the difference in pricing (and commercial deployment) between Level 5.2 and Level 6 HEVC codecs is substantial.

Yet a further consideration relates to utilization of different types of processing relating to the captured image data. Depending on the size/resolution of the captured image data, certain hardware processing may be utilized in place of software-based processing. While software-based processing has advantages in certain circumstances, it is typically far slower than hardware-based data processing and unsuitable from a user experience perspective for more intensive applications. As such, where the data being processed can be constrained or formatted to support hardware-based processing and obviate at least some software-based processing, this is often desirable.

To these ends, methods and apparatus are needed to improve upon conventional processing approaches such as uniform image data scaling, in order to optimize image processing performance, especially in view of the hardware/software of the planned or extant ecosystem within which the captured image data will be used. Moreover, these optimizations should enable increased flexibility as well as enhancing the "experience" for users of this captured content.

SUMMARY

The present disclosure satisfies the foregoing needs by providing, inter alia, methods and apparatus for the processing of captured images using unequal area (UA) or non-uniform (NU) models.

In one aspect, a method for storing and/or transmitting image content is disclosed. In one embodiment, the method includes: capturing image content via one or more image capture apparatus; generating an unequal area (UA) projection from the image content; encoding the UA projection into one or more encoded data containers; and transmitting the plurality of encoded data containers. In one embodiment, encoding the UA projection includes splitting up the UA projection into a plurality of image segments, and encoding the plurality of image segments into the one or more encoded data containers. In one implementation, splitting the UA projection comprises splitting into two image segments. The unequal area projection is a non-uniform projection preserves source lens information.

In one embodiment, capturing of the image content comprises capturing a plurality of images derived from fisheye lens-based sensors, and the unequal area projection includes an unequal area cubemap (UAC) projection. In another embodiment, the unequal area projection is an RSP (rotated sphere projection). In one variant, generating of the UAC projection includes stitching the fisheye images into a spherical projection.

In one implementation, the spherical projection is subdivided into portions corresponding to different parts of the fisheye projection or polynomial. In one approach, the portions of the spherical projection include front, back, left, right, top, and bottom portions of the spherical projection, and the front and back portions of the spherical projection are generated using central portions of the fisheye images (ostensibly having higher image data density or resolution), and the left, right, top, and bottom portions of the spherical projection are generated using peripheral portions of the fisheye images.

In another variant, the generating of the UAC projection includes re-mapping the front, back, left, right, top, and bottom portions of the spherical projection into corresponding front, back, left, right, top, and bottom facets of the UAC projection such that neither of the front and back facets of the UAC projection are equal in size to (any of) the left, right, top, and bottom facets of the UAC projection. In yet another variant, the generating of the UAC projection includes directly mapping the fisheye images onto the UAC projection.

In one implementation, the front and back facets of the UAC projection have identical pixel dimensions (e.g., of width w1 and height h1), wherein the left, right, top, and bottom facets each have identical pixel dimensions (e.g., of w2 and height h2), with w1 being greater than w2.

In another variant, the re-mapping of the spherical projection into the UAC projection includes using a lossless or near-lossless mathematical transform, wherein the splitting up of the UAC projection into a plurality of image segments includes (i) generating a first image segment from a subset of the facets of the UAC projection, and (ii) generating a second image segment from a different subset of the facets of the UAC projection.

In another aspect, a camera apparatus is disclosed. In one embodiment, the camera apparatus includes: a plurality of image capture components; one or more encoding image signal processors; stitching or combinational logic; encoding logic; a data interface; an and a non-transitory computer readable medium. In one exemplary embodiment, the non-transitory computer readable medium includes one or more instructions which when executed by the image signal processor is configured to: cause the plurality of image capture components to capture a plurality of images; map the plurality of images into an unequal area (UA) projection encode the unequal area (UA) projection via the encoding logic into at least one encoded data container; and transmit the at least one encoded data container. In one embodiment, mapping the plurality of images into a UA projection includes stitching the plurality of images into a spherical projection and re-mapping the spherical projection into the UA projection. In one embodiment, encoding the UA includes splitting the UA projection into a plurality of image segments and encoding the plurality of image segments. In one implementation, the UA projection is split into two image segments. In one variant, the UA projection is an unequal area cubemap (UAC) projection. In another variant, the UA projection is an RSP projection.

In one variant, the plurality of image capture components include a first fisheye camera and a second fisheye camera in a Janus-type configuration.

In another variant, the encoding logic includes High Efficiency Video Coding (HEVC) codec logic supporting images not exceeding 4096 pixels in width and 2160 pixels in height. In one such variant, the UA projection is characterized by six facets, wherein not all the facets are identical. In one further variant, the two image segments are 3600 pixels in width and 2160 pixels in height. In yet a further variant, the front and back facets represent X degree field of views (horizontally or vertically), and each of the two image segments includes a contiguous 360-X degree image. In one implementation, the front and back facets represent field of views of 90°, and each of the two image segments include a contiguous 270° image.

In one variant, the mapping of the captured images into the UA projection includes a lossless or near-lossless transform. In yet another variant, the re-map of the spherical projection into the UAC projection includes a lossless or near-lossless transform.

In yet another aspect, a post-processing device is disclosed. In one embodiment, the post-processing device includes: decoding logic; a data interface; a processor; and a non-transitory computer readable medium. In one exemplary embodiment, the non-transitory computer readable medium includes one or more instructions which when executed by the processor is configured to: receive at least one encoded data container; split the at least one container into encoded image data segments; decode the encoded data segments via the decoding logic; stitch the image segments into an unequal area (UA) projection; and re-map the UA projection into a spherical projection. In one variant, stitching the image segments into a UA projection includes a fast stitch operation. In one variant, the UA projection is an unequal area cubemap (UAC) projection. In another variant, the UA projection is an RSP projection.

In one variant, the segments each include multiple UA components corresponding to spatial directions or dimensions such as top, bottom, and back components.

In another variant, the decoding logic includes a first High Efficiency Video Coding (HEVC) codec supporting images not exceeding 4096 pixels in width and 2160 pixels in height.

In another variant, the non-transitory computer readable medium further includes one or more instructions which when executed by the processor is configured to: receive stitching metadata; and recover at least one image from the spherical projection based on the stitching metadata.

In yet another variant, the spherical projection is characterized by a 5760 pixel horizon (representing 360°). In one such variant, the post-processing device further includes: a user interface configured to enable selection by a user of a view angle of interest; and the non-transitory computer readable medium further includes one or more instructions which when executed by the processor is configured to: receive the view angle via the user interface; and generate a 120° image from the spherical projection. In another such variant, the non-transitory computer readable medium further includes one or more instructions which when executed by the processor is configured to generate a 360° panorama from the spherical projection.

In yet another aspect, a non-transitory computer readable apparatus is disclosed. In one exemplary embodiment, the non-transitory computer readable apparatus includes one or more instructions which when executed by the processor is configured to: receive at least one data container; split the at least one data container into at least two encoded image data elements; decode the two encoded data elements into image segments via one or more decoding logic; stitch the image segments into a UA projection; and re-map the UA projection into a spherical projection. In one variant, stitching the image segments into a UA projection includes a fast stitch operation. In one variant, the UA projection is an unequal area cubemap (UAC) projection. In another variant, the UA projection is an RSP projection.

In another embodiment, the non-transitory computer readable medium is for use with a camera apparatus, and includes at least one computer program having a plurality of instructions, the at least one computer program configured to, when executed by the camera apparatus, enable generation of image data covering 360-degrees in azimuth to a first target quality by at least: causing capture of two sets of spherical image data from respective ones of sensors of the camera apparatus; causing a combination of the two sets of image data to form combined image data; causing conversion of the combined image data from a first frame of reference to a second frame of reference using at least a non-uniform algorithmic process, the conversion including creation of a plurality of portions of image data within the second frame of reference; causing allocation of the plurality of portions of image data to two different data segments, each of the two different segments each having: (i) a length and width in pixels that is within the capability of a hardware-based encoder apparatus of the camera apparatus; and (ii) two of said portions which, when added in length to two of said portions of the other of the two data segments, comprise a total in pixels over the 360-degree azimuth corresponding to the first target quality; and causing encoding the at least two different data segments using the hardware-based encoder apparatus.

In a further aspect, a camera apparatus is disclosed. In one embodiment, the camera apparatus includes: a plurality of image capture components; one or more encoding logic; a data interface; an image signal processor; and a non-transitory computer readable medium comprising one or more instructions. In one variant, the plurality of instructions are configured to, when executed by the image signal processor: cause the plurality of image capture components to capture a plurality of images; map the plurality of images into a second projection using at least one non-uniform mapping algorithm; encode the second projection via the one or more encoding logic to produce output data having an encoded format; insert the output data into one or more data containers; and transmit the one or more data containers via the data interface. In one embodiment, the mapping of the plurality of images into a second projection comprises stitching the plurality of images into a spherical projection and mapping the spherical projection into the second projection. In one embodiment, the encoding the second projection includes splitting the second projection into a plurality of image segments and encoding the plurality of image segments. In one variant, the second projection is an unequal area cubemap (UAC) projection. In another variant, the second projection is an RSP projection.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a non-transitory computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device.

Other aspects, features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 8A illustrates a system for the capture and encoding of high resolution imaging content in accordance with some implementations.

FIG. 8B illustrates a system for rendering high resolution imaging content received from the system of FIG. 8A in accordance with some implementations.

Figure 1:
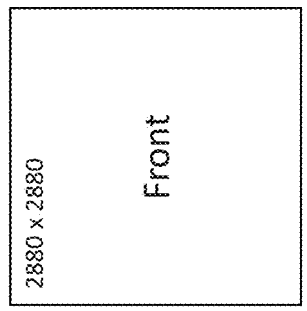
FIG. 1 is a graphical depiction of a uniform down-sampling process as applied to an image data having a non-uniform image data density associated therewith.
Figure 1:
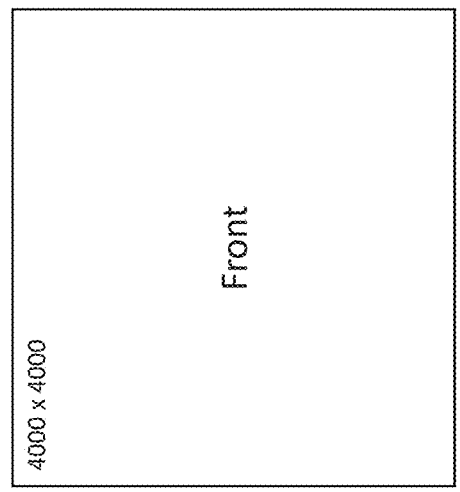
Figure 1:
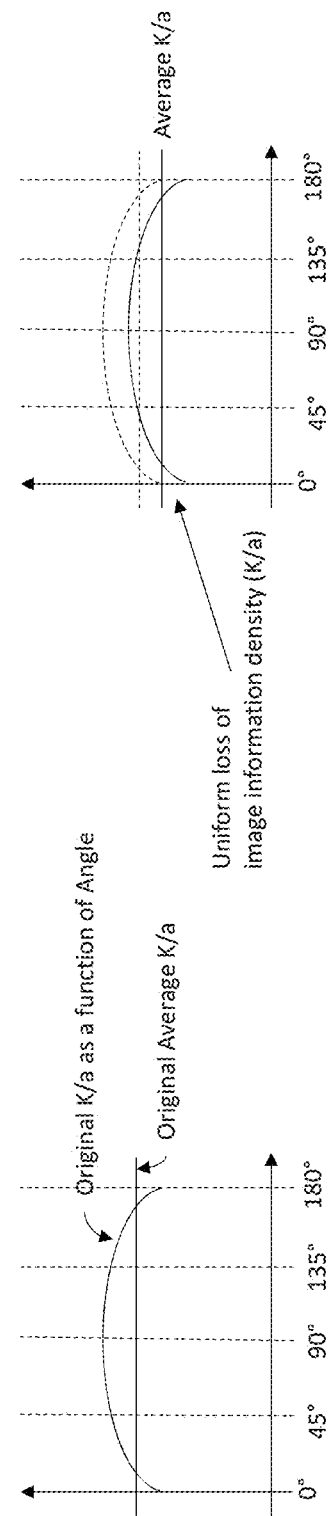
Figure 2:
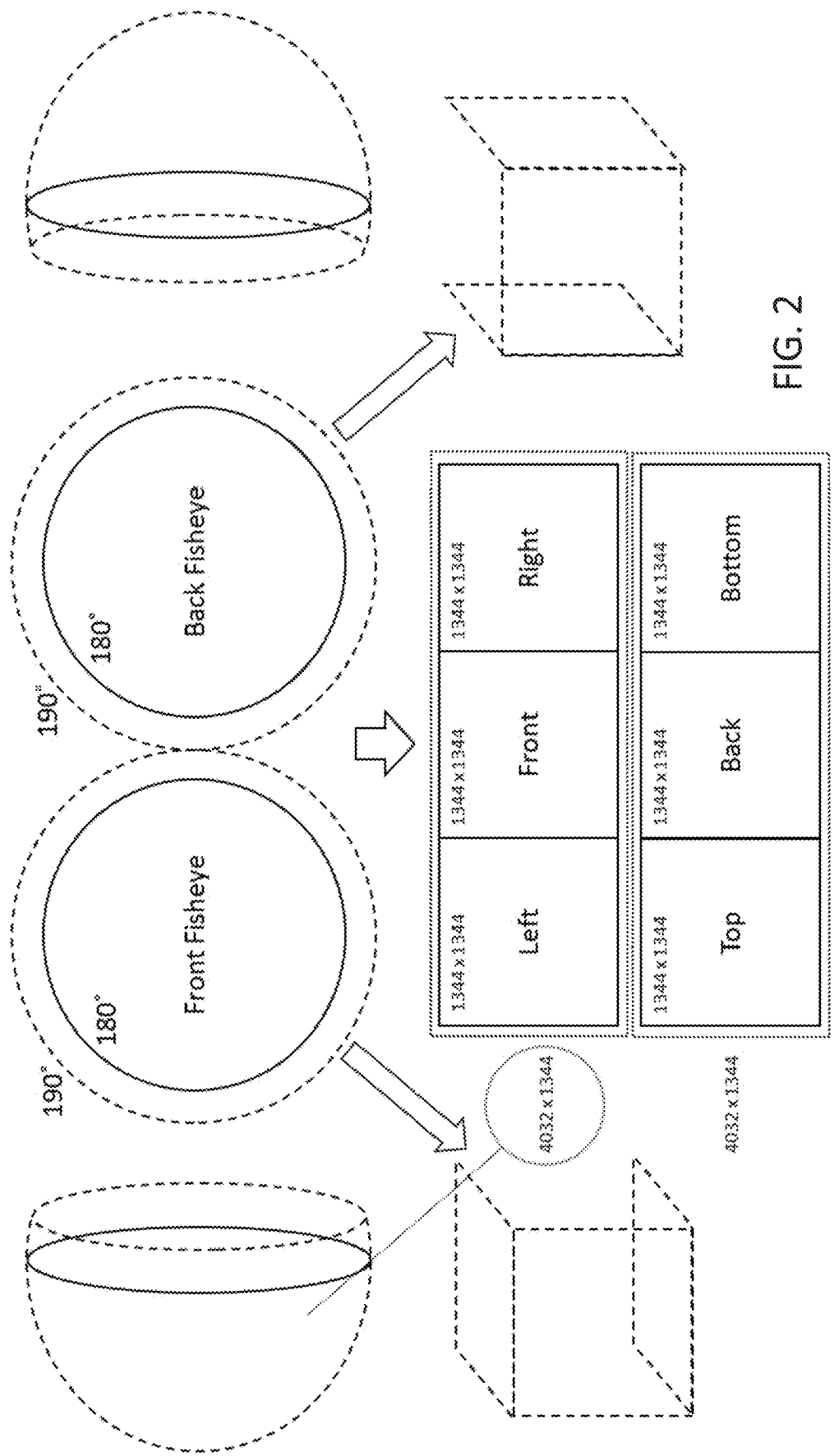
FIG. 2 is a graphical depiction of generation of an equi-angular cubemap (EAC) from image data captured from two fisheye lens sensors.

All Figures disclosed herein are © Copyright 2017-2019 GoPro, Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview—

In exemplary aspects, the present disclosure provides methods and apparatus which advantageously leverage one or more desirable attributes of extant hardware/software ecosystems for image processing to provide a high level of image resolution and quality as well as user experience. As discussed supra, it would be highly desirable to have an improved A/V format and associated methods and apparatus that could represent e.g., a 360° panorama with 3×1920 (or 5760 pixels) which could effectively provide a 1080p image for any viewing angle, and yet which would be compatible with extant and widely deployed hardware-based encoding processes (such as Level 5.2 HEVC codec) which can only support video formats of lesser resolution (e.g., 4096×2160 pixels or 4K). The present disclosure provides such improved format, methods and apparatus.

To these ends, various aspects of the present disclosure are directed to re-mapping image data into A/V container formats that can fit within the limitations of existing commodity video codecs such as those compliant with HEVC Level 5.2. In one exemplary embodiment of the present disclosure, an action camera can perform an "in-camera" stitch to encode a spherical video as an unequal area (UA) or non-uniform (NU) projection is described. In one variant, the UA/NU projection is rendered as a UAC (unequal area cubic) and can be further segmented into a desired frame of reference; e.g., first image (left, front, right) and a second image (top, back, bottom) for distribution within existing codec infrastructure. In one such exemplary variant, the split UAC images are each composed of three (3) pixel facets that combine such that a 360-degree view (comprised of front, back, left and right components of the foregoing) combine to a value which most fully utilizes the limitations of the prevailing hardware codec (e.g., HEVC 5.2 with 4096× 2160) yet which achieve the ability to render a full 1080P image of 5760 pixels. Advantageously, by the split UAC images fitting within 4K video formats supported by Level 5.2 HEVC encoder/decoders, expensive Level 6 HEVC encoder/decoders or the much slower software emulator codecs are avoided.

UA/NU Encoding and Decoding—

Exemplary UA/NU encoding and decoding schemes are now described in greater detail. It will be appreciated that as used in the present context, the term "unequal area" refers without limitation to segmentation of the image data (e.g., pixels) into the target frame of reference (e.g., Cartesian "X/Y/Z") in areas that are not all equal. Likewise, as used in the present context, the term "non-uniform" refers without limitation to techniques that treat or scale captured data (pixels) differently from "useful" pixels. For instance, in one specific embodiment described in greater detail infra, the pixels captured by the image sensors(s) are scaled so as to maximize image information density (K/a) within the regions having the useful pixels.

As discussed briefly above, the A/V encoding/decoding format chosen for a particular application is driven by a number of different considerations. In terms of codecs, even though the codec standardization process is seamless for large changes in functionality, subsequent revisions often have mixed adoption. Additionally, most hardware that is already deployed has "hardened" physical logic that cannot be changed; as a result, modifications to hardware functionality can be very difficult. Manufacturing specialized hardware to support revisions to A/V formats can be very expensive; in some cases, many times more expensive than the commodity alternatives. In contrast, software is highly dynamic, and software features regularly track the whims of commercial markets. As a result, there is often significant pressure to implement new software features within the limitations of existing hardware deployments.

As but one example, an area of significant commercial interest is spherical video photography. One spherical viewing format represents 120° of viewing angle as a 1920×1080 (more commonly referred to as "1080p") image. As previously noted, an A/V format that could represent a 360° panorama with 3×1920 (or 5760 pixels) could effectively provide a 1080p image for any viewing angle. Unfortunately, the widely deployed so-called "Level 5.2" HEVC codec can only support video formats of up to 4096×2160 pixels or "4K". Level 6 HEVC codecs can support much larger video formats, but their difference in pricing (and commercial deployment) as compared to Level 5.2 is substantial. Moreover, handling spherical video encoding/decoding in software is too slow for video applications.

Additionally, as described with respect to FIG. 1 herein, the non-uniform image density of image data captured by spherical sensor-based devices such as those manufactured by the Assignee hereof presents additional challenges for conventional encoding processes.

To these ends, various embodiments of the present disclosure are directed to re-mapping image data having non-uniform resolution density into A/V container formats that preserve maximum amount of pixel information and fit within the limitations of existing commodity video codecs.

In one embodiment of the present disclosure, an action camera can perform an "in-camera" stitch to encode (re-map) a spherical video having non-uniform image density as a Cartesian shape or structure; i.e., an unequal area cubemap (UAC) projection. Generally, the non-uniform image density has a distribution such that the highest resolution density is found at the front and back portions of the spherical videos, corresponding to image data gathered at the central lens angles of two opposite-facing (fisheye) sensing devices; and the lowest resolution density is found at the left, right, top, and bottom portions of the spherical videos, corresponding to image data gathered at the peripheral lens angles of the two fisheye devices. These front, back, left, right, top, and bottom portions of the spherical video are mapped onto corresponding front, back, left, right, top, and bottom facets of the UAC projection.

The above-described UAC projection can advantageously further be segmented into different aggregations of its constituent portions, such as for instance a first or "horizontal" image (left, front, right facets of the UAC projection) and a second "vertical" image (top, back, bottom facets of the UAC projection), such as for compatible distribution within existing codec infrastructure. In one variant, the front and back facets of the UAC projection are allocated more resources (e.g., memory) than the left, right, top, and bottom facets, so as to preserve more of the high image density data present in the spherical video. It is appreciated, however, that as discussed below with respect to FIG. 6C, this logic may be changed or inverted, such as where it is desired to reduce such image data density preservation, or for other reasons.

In one such exemplary variant, the split UAC images are each composed of one (1) central (2160×2160 pixel) facet and two (2) side (720×2160 pixel) facets. In another exemplary variant, the split UAC images are each composed of one (1) central 2160×2160 pixel facet and two (2) side 720×720 pixel facets. These split UAC images fit within 4K video formats supported by Level 5.2 HEVC encoder/decoders, since the total of the 360-degree image is 2160+2160+720+720=5760, the limit of the HEVC 5.2 hardware compression logic. Advantageously, the resulting UAC image can be used with very little post-processing to interpolate a 360° panorama of 5760 pixels. Furthermore, the UAC projection can be mapped back into a spherical video having retained maximum image data within prescribed parameters.

In the above example, UAC encoding is applied to image data gathered with a particular image density distribution. However, it can be understood that other image density curves are possible with different lens polynomials, and that different corresponding UAC projection configurations may be applied (see, e.g., discussion of FIG. 6C below).

Figure 4A:
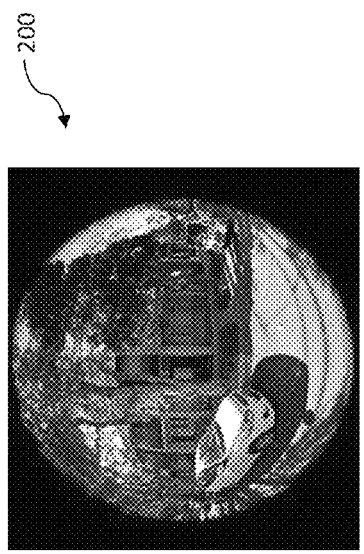
FIG. 4A is a pictorial representation of a fisheye projection of a captured scene, in accordance with the principles of the present disclosure.
Figure 4C:
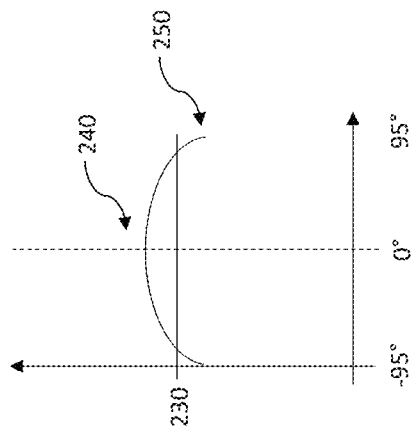
FIG. 4C is a plot of resolution density as a function of angle for the lens of FIG. 4B, in accordance with the principles of the present disclosure.
Figure 4B:
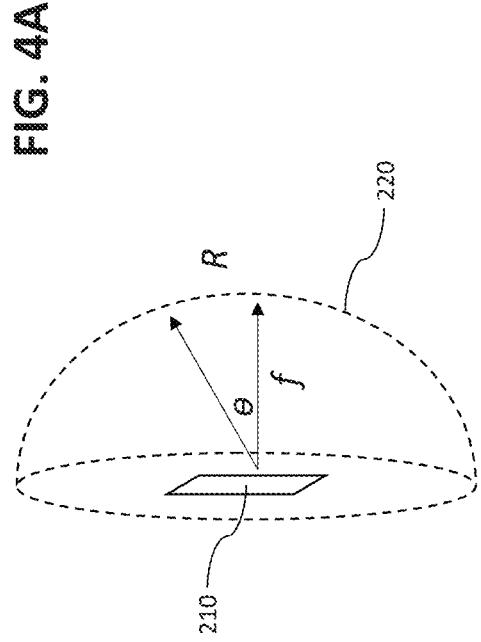
FIG. 4B is a graphical representation of a lens of an exemplary spherical camera system, in accordance with the principles of the present disclosure.
Figure 4D:
FIG. 4D is a rectilinear image representing a captured scene, in accordance with the principles of the present disclosure.
Figure 4E:
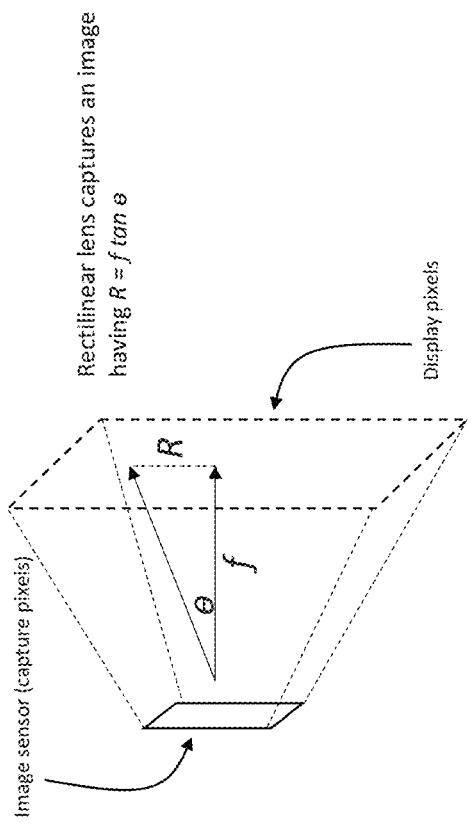
FIG. 4E is a graphical representation of a lens of an exemplary ERP camera system, in accordance with the principles of the present disclosure.

It is further noted in passing that "commodity" codecs of the type previously described were originally designed and optimized for rectangular projections (see FIGS. 4D and 4E). As a result, the most common A/V formats often resort to lossy encoding. Lossy-encoded images that are heavily compressed before being stitched (e.g., "off-camera") can result in undesirable image artifacts because the stitching (e.g., via post-process stitching algorithms) is working with distorted images rather than original source images.

In contrast, exemplary embodiments of the present disclosure perform at least a coarse stitch "in-camera." Even though the in-camera stitched image cannot be natively transferred off camera (the stitched image is larger than the commodity codec A/V formats), the in-camera stitching uses the original source images to ensure that the resulting stitched image seamlessly transitions between perspectives, thereby minimizing compression artifacts. After such in-camera stitching, the stitched image can be optionally split into formats that can be supported in the commodity codec ecosystem.

Figure 3:
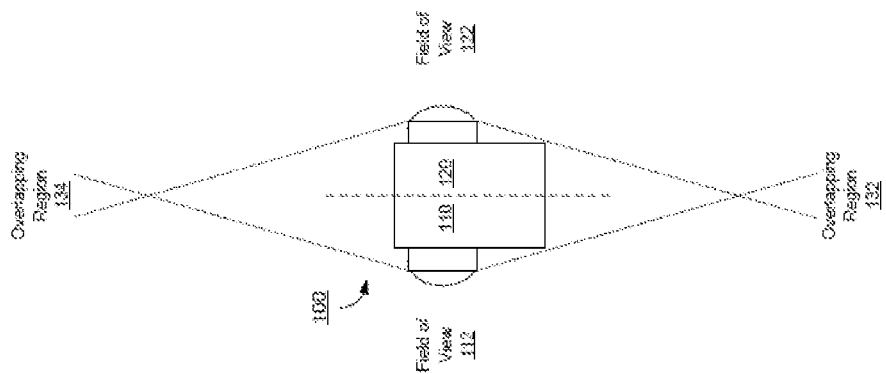
FIG. 3 is a block diagram of an exemplary implementation of a capture (e.g., action camera) device, useful in performing the methodologies described herein.

FIG. 3 illustrates an embodiment of an example spherical camera system 100 that may include a first camera 110 capturing a first field of view (FOV) 112 and a second camera 120 capturing a second FOV 122. In one or more implementations, the cameras 110, 120 may be integrated in a back-to-back configuration in which cameras 110, 120 face opposite directions. For example, in operation, the first camera 110 may be a "front-facing" camera 110 such that a user may point the first camera towards an object or scene of interest and the second camera 120 may be a "rear-facing" camera facing in an opposite direction of the front-facing camera 110. While the designations of front-facing and rear-facing are useful in describing the example processes described herein, these designations are arbitrary and the camera system 100 may operate in any orientation.

The fields of view 112, 122 may each include a hyper-hemispherical FOV that captures slightly greater than a 180° range in at least one direction. Because the respective fields of view 112, 122 are hyper-hemispherical (e.g., greater than 180°), they overlap in overlapping regions 132, 134 near their respective boundaries. For example, the fields of view 112, 122 may overlap by n degrees (e.g., where n equals 1°, 5°, 10° or other various degrees of field of view overlap between, for example, a front-facing and rear-facing camera). These overlapping regions 132, 134 may be used for the stitching of separately captured images obtained by the respective cameras 110, 120, as will be described in further detail below. In implementations where the respective FOV ranges are equal for each of the first camera 110 and the second camera 120, these configurations will be referred to hereinafter as symmetric lensing configurations.

In some implementations, the first camera 110 may be configured to capture one range in at least one direction (e.g., 195°), while the second camera 120 may be configured to capture a different range in at least one direction (e.g., 225°). In other words, the first and second cameras 110, 120 may capture differing ranges in their respective fields of view 112, 122 so long as their fields of view overlap in at least one overlapping region 132,134. In implementations where the respective FOV ranges differ for each of the first camera 110 and the second camera 120, these configurations will be referred to as asymmetric lensing configurations.

It will be appreciated that certain camera configurations contain three (or more) cameras; the corresponding field of views for these cameras don't necessarily have to be hyper-hemispherical (i.e., greater than 180°). For example, in an implementation that utilizes three cameras, each of these cameras may capture an image that has a FOV that is greater than a 120° range in at least one direction, so that the resultant images may be stitched together into a full 360° field of view. Implementations that utilize three (or more) cameras may collectively contain either a symmetric lensing configuration or, alternatively, may collectively contain an asymmetric lensing configuration. Similarly, where a complete panorama is not required (e.g., less than a full 360° field of view), fewer cameras with reduced view angles can be used with equivalent success.

The number of pixels in a camera sensor and the FOV are typically "fixed" in a camera system and do not change during use. Generally, the manufacturer will design the camera to suit the intended application(s). For instance, an activity camera that is mobile and rugged will have different capture parameters than a cinema-quality camera designed for e.g., crane mounts or other bulky steadying platforms. Artisans of ordinary skill in the related arts will readily appreciate that the same number of pixels may be used to capture a larger FOV at lower resolution, or a smaller FOV at a higher resolution. For instance, a ten (10) Megapixel (MP) camera sensor that is coupled to a 195° FOV lens provides a higher effective resolution than the same 10 MP camera sensor used for a 245° FOV lens.

As shown in the configuration of FIG. 3, the overlapping regions 132, 134 are fixed and do not change during use. Camera manufacturers may design the camera body with larger or smaller overlap regions; a larger overlap region may be used for better quality image stitching, but can result in an overall drop in image resolution as a result of a lower amount of pixels per degree of FOV (i.e., a lower number of pixels per degree of FOV). Conversely, a smaller overlap region may be used for lower quality image stitching, but may result in an overall increase in image resolution for the captured image.

In other designs, the overlapping regions may be configurable, due to changes in the camera body and/or lens. Video variants may even be able to dynamically change overlap regions during an ongoing capture. For example, video cameras may have optical lens elements that can physically change (even during ongoing capture) e.g., a zoom body that allows the camera to change the focal length. Similarly, static cameras are commonly designed with modular components that can be changed out; for example, different lens attachments can impart different view angles and/or focal lengths. Some cameras may even be constructed to allow different sensors or may selectively use different sensors with different capture characteristics (e.g., switching between optical and IR sensors, or between higher and lower capture quality sensors).

While the embodiments described herein discuss specific resolution and image density profile examples, it would be readily apparent to one of ordinary skill that these specific resolutions and density profiles are merely exemplary and that other values of each could be readily substituted with equal success. The following discussion merely being exemplary.

Spherical camera systems, such as the spherical camera system 100 shown in FIG. 3, capture images through the use of a fisheye lens. A fisheye lens is an ultra wide-angle lens that produces visual distortion, particularly towards the edges of a capture scene. FIG. 4A illustrates an exemplary captured scene 200 that illustrates the high levels of distortion towards the edges of the fisheye projection and lower levels of distortion towards the center focal point of the fisheye projection. FIG. 4B illustrates the cause of the distortion. In particular, the distortion is caused due to the geometry of the lens 220 as the lens focuses light onto an image sensor 210. Additionally, the geometry of the lens 220 also affects the resolution (image) density of the captured image. In some common lens designs, as can be seen in FIG. 4B, light that enters the lens 220 in a manner that is orthogonal to the image sensor will have the highest amount of resolution. Conversely, light that enters the lens 220 at oblique angles to the image sensor will have lower amounts of resolution. FIG. 4C illustrates an exemplary resolution density as a function of viewing angle for a fisheye lens. As can be seen, the portion 240 of the captured scene at the center of the lens has the highest resolution or image data density, while the portion 250 away from the center of the scene has a comparatively lower resolution density. The average resolution (or effective resolution) is illustrated by line 230. For example, a captured scene with an effective resolution of 4K will actually have a greater than 4K resolution at the center portion 240 of the captured scene, and a lower than 4K resolution at the outer portions 250 of the capture scene. Alternate lens designs may enable image edges to have sharper resolutions than the image center (as discussed, for example, with respect to curve 310 in FIG. 5 below).

Figure 5:
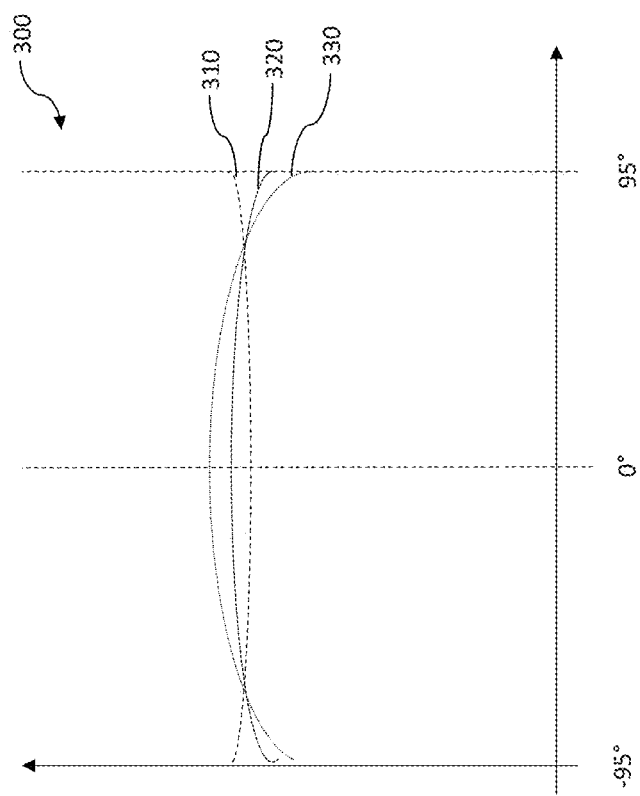
FIG. 5 is a plot of resolution density as a function of angle for a number of differing lenses, in accordance with the principles of the present disclosure.

FIGS. 4D and 4E illustrate an exemplary rectilinear lens that may be used consistent with the methods and apparatus of the present disclosure. As with the fisheye lens of FIGS. 4A-4C, the rectilinear lens has an inherent variation in image resolution density as a function of the angle of the incident energy. As discussed above, the resolution density curve is a function of the lens geometry as is shown in FIG. 5. For example, a fisheye lens may have a resolution density as a function of viewing angle that is represented by curve 330. Other lens geometry may have a "flatter" resolution density as represented by curve 320. Yet other lens geometry may have an "inverted" resolution density as represented by curve 310. In the case of inverted resolution density curve 310, the resolution is effectively the highest towards the edges of the captured scene and lowest towards the center of the scene. Contrast this with curves 320, 330 where the resolution density is the lowest towards the edges of the captured scene. It should be noted that the foregoing curves 310, 320, 330 are merely exemplary and that other lens geometries may collectively produce an effectively countless number of resolution density curves.

Traditional projections have not been optimized for use with panoramic image capture that use fisheye lenses. Particularly, traditional encoding allocates equal numbers of pixels (i.e., equal amounts of memory) to equal areas of view, regardless of the difference in resolution density between the different areas. This equal allotment technique may inefficiently capture too much data from the periphery of the lens, and lose too much data from the center of the lens (or vice versa with an inverted lens distribution 310).

Figure 6:
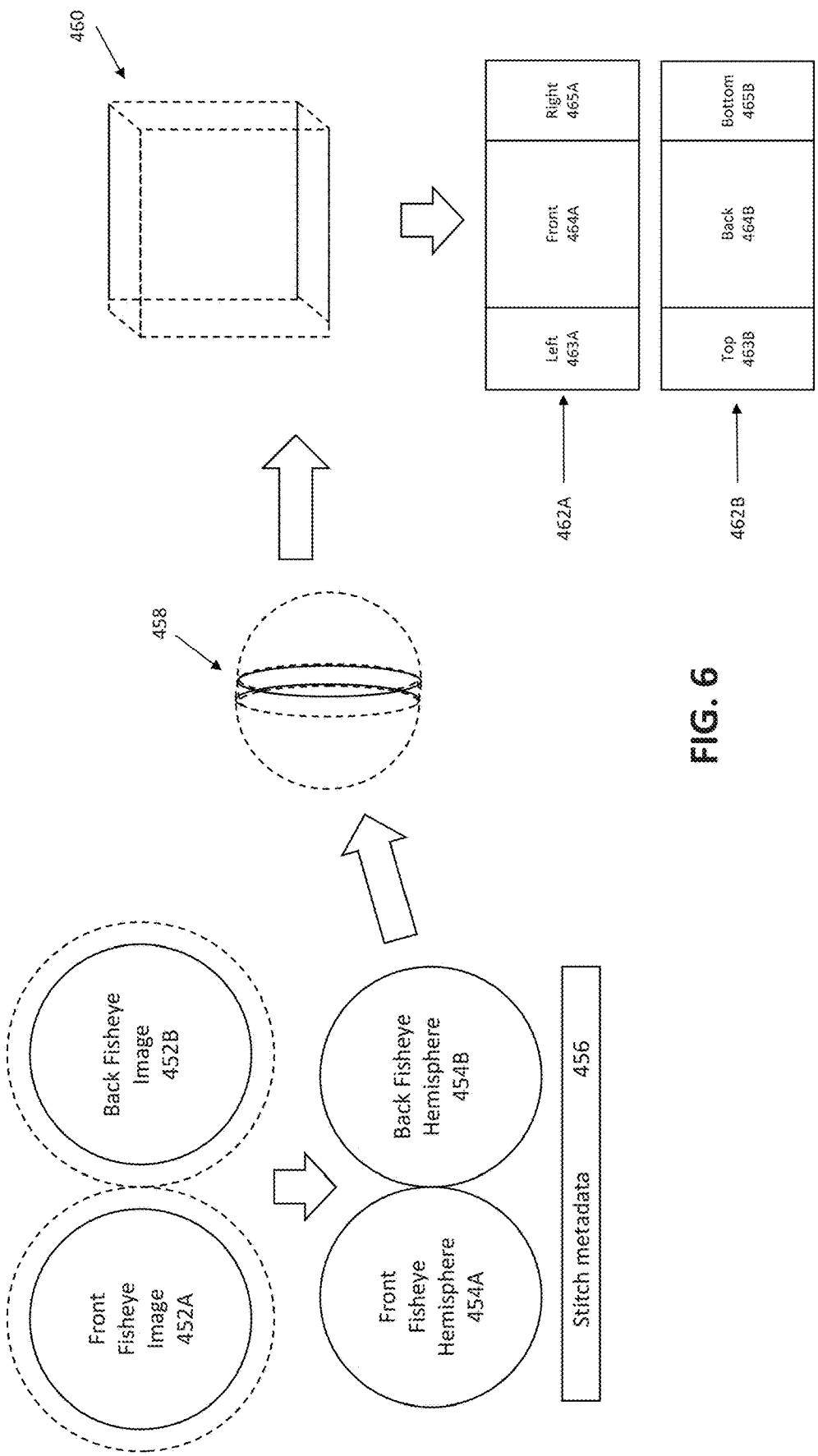
FIG. 6 illustrates conversions from wide-angle images to respective unequal area cubemap (UAC) images, in accordance with one exemplary implementation.

FIG. 6 is a diagram showing an exemplary embodiment of a conversion process from a spherical projection onto a non-uniform projection (e.g., an unequal area cubemap (UAC) projection). In various embodiments, a fisheye camera or capture device may capture hemispheric image data that corresponds to fisheye images 452A, 452B having a field of view. Each fisheye image 452A, 452B may be taken by a fisheye lens out of a plurality of lenses; for example, an image capturing system may include two fisheye lenses in a Janus-configuration, one facing in a "front" direction and another facing in a "back" direction. In one variant, the fisheye image has a field of view of greater than 180 degrees. The overlapping area can be used to assist in stitching.

The fisheye image data may be stitched "in-camera" into two (2) hemispheres 454A, 454B of a spherical projection 458. Artisans of ordinary skill in the related arts will readily appreciate that stitching in-camera must image information between the two (2) original images 452A, 452B in order to generate the two (2) hemispheres 454A, 4534B of a spherical projection 458; this process may result in some information loss. As a result, in some variants, the stitching information 456 may additionally be retained for subsequent editing (e.g., re-stitching at higher quality, etc.). Stitching techniques commonly entail e.g., combining multiple images to ideally produce an imperceptible (or minimally perceptible) transition between the two (2) hemispheres 454A, 454B of the spherical projection 458. Image stitching techniques commonly include e.g., edge detection, motion detection, parallax correction, perspective warping, blending, lighting adjustment, and/or any number of other image modifications commonly used in the related arts.

Referring back to FIG. 6, the spherical projection 458 is converted into an UAC projection 460. As previously noted, the spherical projection may be divided into front, back, left, right, top, and bottom portions, wherein each portion represents image data from corresponding fields of view from the two fisheye cameras. For example, the front portion of the spherical projection corresponds to image data from the center of the front fisheye image 452A. The size of the field of view represented by the front portion of the spherical projection corresponds to a viewing angle θ, taken from a line orthogonal to the lens (as illustrated, for example, in FIG. 4B). The back portion of the spherical projection corresponds to image data from the center of the back fisheye image 452B. The top portion of the spherical projection corresponds to image data stitched together from the top parts of the front and back fisheye images 452A/452B. The left, right, and bottom portions of the spherical projection are similarly collected from their corresponding images.

The front, back, left, right, top, and bottom portions of the spherical projection are mapped onto corresponding front 464A, back 464B, left 462A, right 465A, top 463B, and bottom 465B facets of the UAC projection 460. In one implementation, the converted UAC image 460 can be further split into a first image segment 462A corresponding to the left 463A, front 464A, and right 465A facets, and a second image segment 462B corresponding to the top 463B, back 464B, and bottom 465B facets.

Notably, an ideal mathematical transform to the UAC projection can be performed with minimal information loss. In other words, some mathematical transforms can enable a near lossless conversion from spherical-to-UAC conversion and vice versa. However, some embodiments of the present disclosure may additionally remove image information so as to e.g., fit within various codec parameters. More directly, in some cases, information loss may be preferred to fit within certain encoding/decoding limitations of a hardware or software codec.

In one embodiment, the UAC image 460 may represent a "panoramic" view including multiple portions that are viewable by, e.g., a viewfinder, physical or otherwise; e.g., a viewfinder may refer to portion of a larger panoramic image which is virtually navigable via a user interface, and the panoramic image may be stored and/or accessible on a device (e.g., user device) and/or a system that accesses the panoramic image stored on a remote server or storage device separate from the user interface.

Figure 6A:
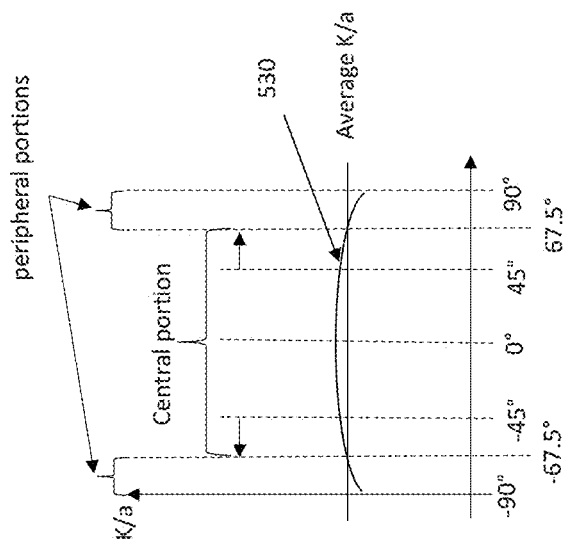
FIG. 6A illustrates a plot of resolution density as a function of angle for one fisheye lens, in accordance with one exemplary implementation.

In one exemplary embodiment, referring to FIG. 6A, a fisheye lens may have a resolution density as a function of viewing angle θ that is represented by curve 530. The resolution (pixels K per area a) is highest toward the center of the captured scene and lowest towards the edges of the captured scene. The image data gathered though this fisheye lens can be conceptually divided into a central portion and peripheral portions, as show in FIG. 6A, although this division is arbitrary, and other schemes may be used consistent with the present disclosure. The central portion of the captured scene may correspond to all image data taken within a certain central viewing angle $θ_c$ that is between 0 and 90 (if the total field of view of the camera has a 180° range). In one implementation, the "central" viewing angle $θ_c$ (i.e., that with the greatest image information density) is greater than 45°. Various criteria can be used for specifying the limits of this region; e.g., mean image information density within that region which is above a prescribed threshold, where the slope of the image density profile achieves a certain value, or some other metric. It is noted that although FIG. 6A illustrates central viewing angle $θ_c$ as 67.5°, it should be noted that the present disclosure is not limited to this particular angle.

Figure 6B:
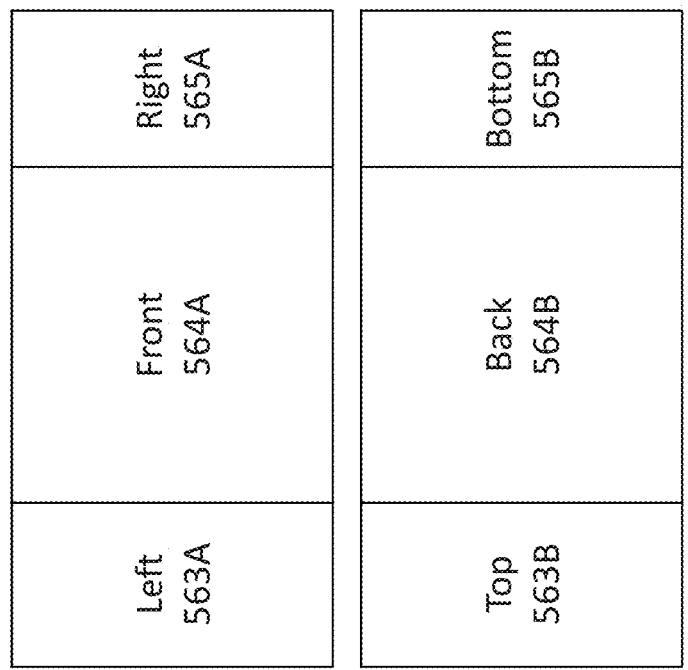
FIG. 6B illustrates one exemplary unequal area cubemap (UAC) projection of image data having resolution density shown in FIG. 6A, in accordance with the principles of the present disclosure.
Figure 6B:
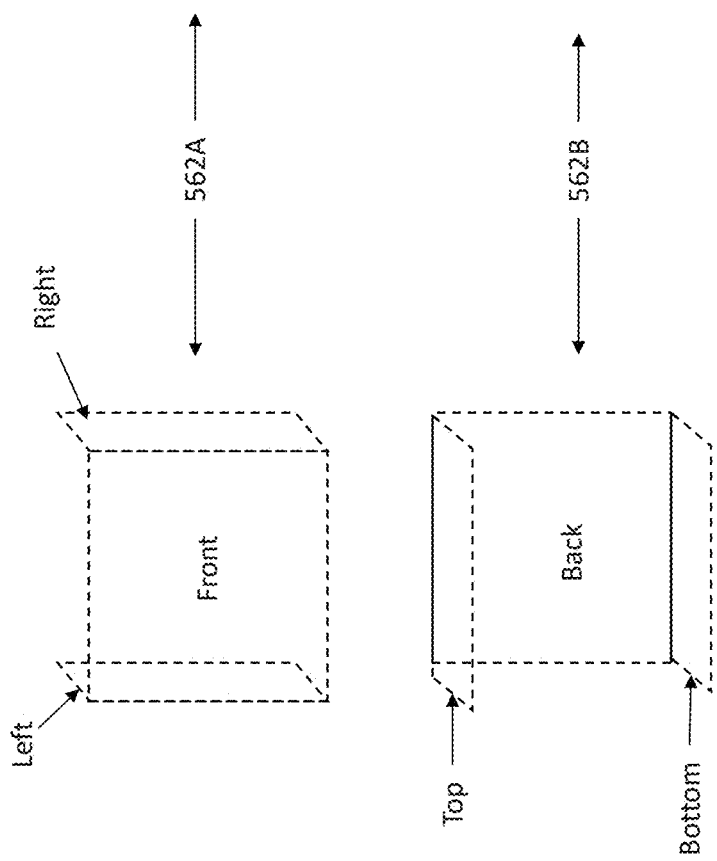
Figure 6C:
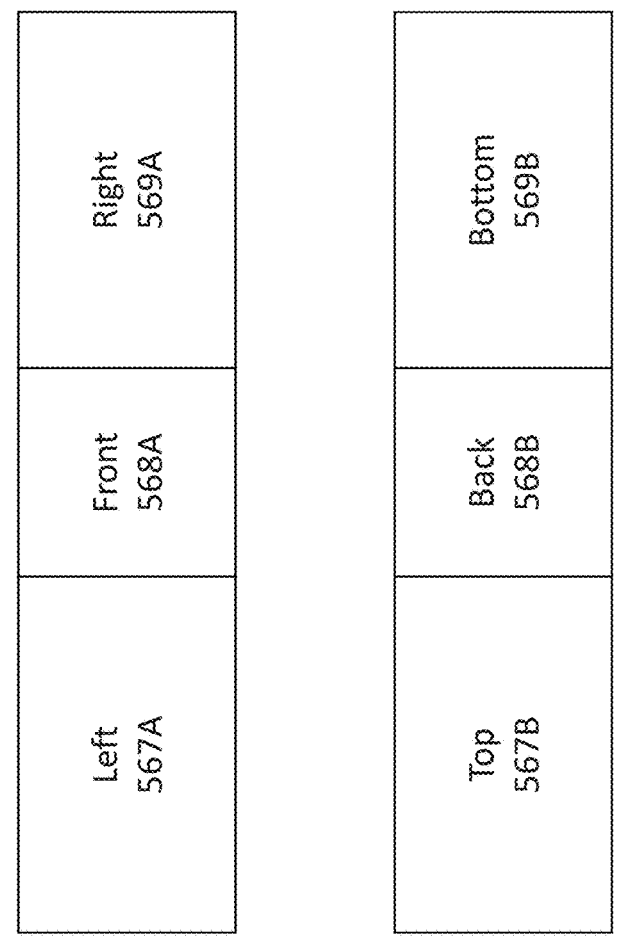
FIG. 6C illustrates another exemplary unequal area cubemap (UAC) projection of image data having resolution density, in accordance with the principles of the present disclosure.
Figure 6C:
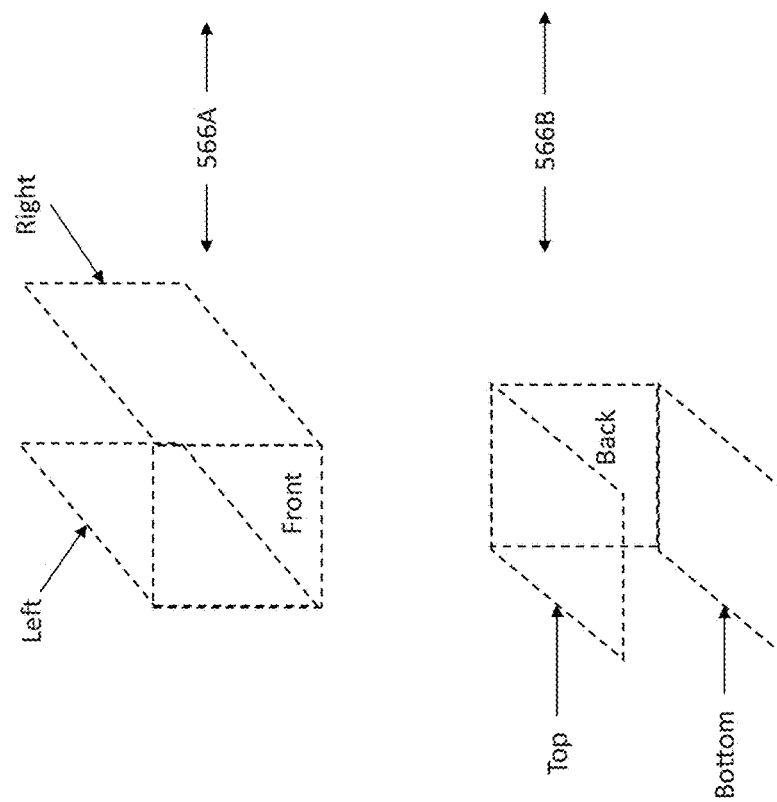

FIG. 6B illustrates one embodiment of a UAC projection generated using methods and configurations described herein. The UAC projection is conceptually broken up into first and second image segments 562A/562B. The first image segment corresponds to the left 563A, front 564A, and right 565A facets of the UAC projection, and the second image segment corresponds to the top 563B, back 564B, and bottom 565B facets of the UAC projection. The front and back facets are generated using image data from central portions of front and back fisheye images, and the left, right, top, and bottom facets are generated using image data from peripheral portions of the front and back fisheye images. As previously noted, the resolution of the typical fisheye image is higher in the central portion thereof, and lower in the peripheral portions of the image. Thus, in order to optimally preserve pixel information, the UAC projection allocates more space to its front and back facets, and less space to its left, right, top, and bottom facets. In one implementation, the front and back facets may have a resolution of 2160×2160 pixels, while the left, right, top, and bottom facets may have a resolution of 720×2160 pixels. In this case, each UAC image segment (having three facets) may have a resolution of 3600×2160 pixels. The above example seeks to provide an optimal UAC projection that stays within HEVC 5.2 codec formats (which cannot exceed 4096×2160 pixels) and provides a 360° image (front, left, right, and back facets) having 5760 pixels. However, it should be understood that a UAC projection of the present invention may have facets having other pixel dimensions. For instance, use of non-symmetrical "peripheral" facet dimensions is contemplated by the disclosure, such as where e.g., the left, front, and right portions shown have a different allocation between the individual portions or ratios therebetween, than those associated with the back, top and bottom portions Consider also "inverted" image information density profiles; a lens may provide image data having lower resolution density toward the center of the lens and higher resolution density toward the periphery of the lens. In such a case, the corresponding UAC projection might allocate less resources (a smaller sized facet) towards image data from the center of the lens and more memory (larger sized facets) towards image data from the peripheries of the lens (see FIG. 6C).

Figure 6D:
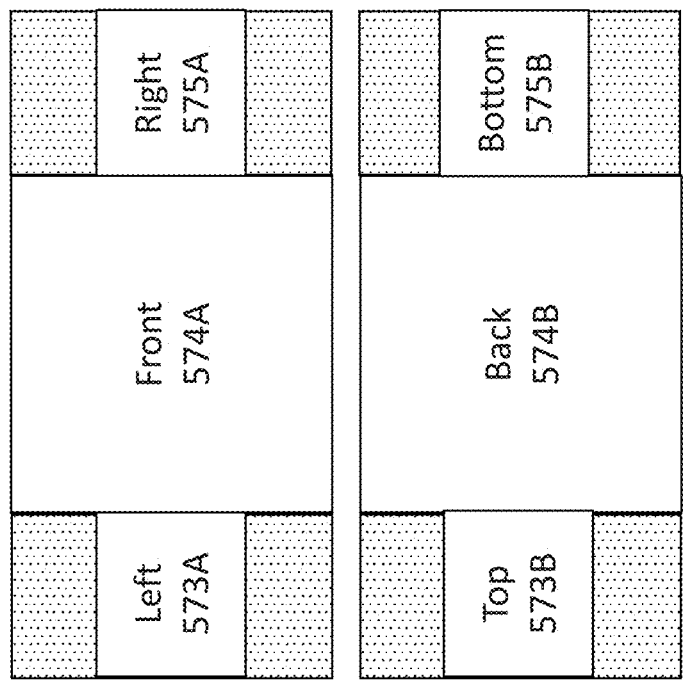
FIG. 6D illustrates yet another exemplary unequal area cubemap (UAC) projection of image data having resolution density shown in FIG. 6A, in accordance with the principles of the present disclosure.
Figure 6D:
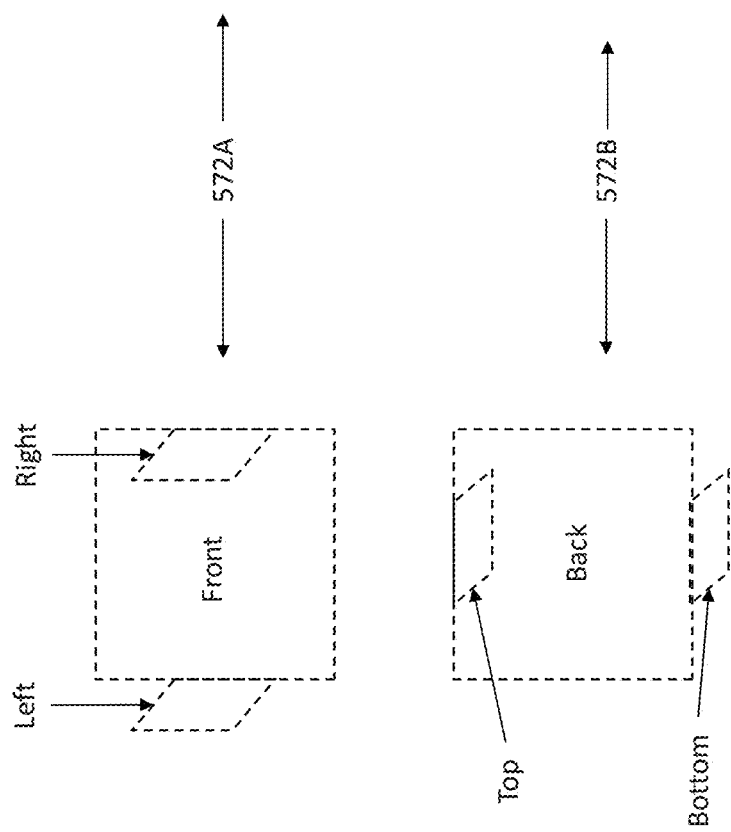

FIG. 6D illustrates another embodiment of a UAC projection generated using methods and configurations described herein. Similar to the previous embodiment, the UAC projection is broken up into first and second image segments 572A/572B. The first image segment corresponds to the left 573A, front 574A, and right 575A facets of the UAC projection, and the second image segment corresponds to the top 573B, back 574B, and bottom 575B facets of the UAC projection. The front and back facets of the UAC projection are larger than the left, right, top, and bottom facets of the UAC projection. In this embodiment, all six facets of the UAC projection constitute square image facets. For example, the front and back facets may have a resolution of 2160×2160 pixels, while the left, right, top, and bottom facets may have a resolution of 720×720 pixels. Each UAC image segment (having three facets) may still be considered to a resolution of 3600×2160 pixels, with some portions of the UAC projections containing null space. Although the above embodiment does not map captured pixel data onto the entire available UAC projection, this type of configuration has the additional benefit of providing a UAC format that may be easily converted to and from an equi-angular cubemap (EAC) projection format. Furthermore, the additional null space could be used to store extra data, such as time and location of the captured scene.

FIGS. 6-6D illustrate embodiments of the present invention geared to particular lens geometries and camera configurations. However, it should be noted that the concept of using an unequal area projection (such as a UAC projection) may be applied to image data collected using different types of lenses and different camera configurations. As one example related to a different camera configuration, spherical video may be collected using three outwardly facing fisheye cameras, each camera configured to capture approximately 120° of the 360° horizon. In the instant case, the image data may be remapped onto a non-cubemap shape or frame of reference (e.g., non-Cartesian), unequal area projection having three larger facets corresponding to high resolution images taken at the central angles of the three cameras, and a number of smaller facets corresponding to low resolution images taken at the peripheral angles of the three cameras.

As should be apparent given the contents of the present disclosure, portions of the foregoing image data mapping process may be reversibly performed in a lossless manner. For example, referring to FIG. 6, UAC image segments in 462A, 462B can be joined together to recreate the UAC structure 460. In at least one exemplary embodiment, the UAC structure 460 can be transformed losslessly back into a spherical projection 458. The stitching metadata 456 retains all of the information necessary to re-stitch the two (2) hemispheres 454A, 454B of the spherical projection 458. In other words, the described principles herein enable stitching of originally captured image data, and selectively performing all subsequent lossy processing in a manner that can be recorded and/or corrected for.

Exemplary Capture and Rendering Apparatus—

Figure 7A:
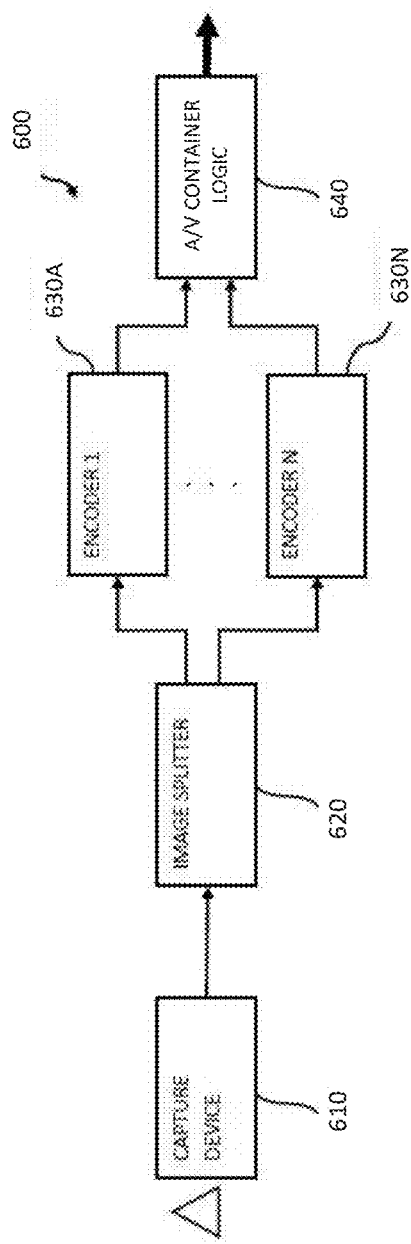
FIG. 7A illustrates a system for the capture and encoding of high resolution imaging content in accordance with some implementations.

Referring now to FIG. 7A, an exemplary system 600 for the capture and encoding of high resolution imaging content is shown. As used herein, the terms "high resolution" and "high resolution imaging content" refers to the fact that, for example, natively captured imaging content (e.g., still images, video content, stereoscopic, and/or panoramic versions of the foregoing) may not be compatible with a single instance of, for example, extant video encoders/decoders (e.g., codecs). For example, common smartphone device codecs are typically limited to 4K resolution (approximately 4096×2160 pixels) at sixty (60) frames per second. However, it is not uncommon for image capture devices to natively capture imaging content at higher resolutions and higher frame rates than are currently supported by many single instances of these extant video codecs. For example, and referring back to FIG. 7A, the image capture device 610 (e.g., camera) may be capable of generating, for example, 6K image resolution (e.g., 5760×4320, 5760×3240, 6144× 3072 or similar, depending on aspect ratio) or 8K image resolution (e.g., 7680×4320) at thirty (30) frames per second. While the aforementioned image resolutions and frame rates are exemplary, it would be readily apparent to one of ordinary skill given the contents of the present disclosure that the present disclosure is not so limited, these aforementioned image resolutions and frame rates merely being exemplary.

The captured imaging content (e.g., natively captured imaging content) may be coupled to an image splitter 620 on the encode-side of the capture side of the processing pipeline. For example, the image splitter 620 may be resident on the image capture device 610 in some implementations. The image splitter 620 may be in signal communication with the image capture device 110 via either a wired or wireless network communications link. The image splitter 620 may split up the captured imaging content and pass along this split up captured imaging content to a series of N encoders 630A . . . 630N.

In some implementations, an encoder may include hardware logic. In other implementations, an encoder may be a software-based logical function emulating the functionality of an encoder. Artisans of ordinary skill in the related arts will readily appreciate that hardware logic based codecs are substantially faster than software emulated codecs (e.g., approximately fifty (50) times faster); however, hardware logic is largely inflexible and cannot be changed post-manufacture, whereas software can be easily re-compiled to support new functionality. Notably, some devices may support both onboard hardware codecs for the most common applications, and emulate codecs in software only where needed (such as when the limits of the hardware codec are exceeded).

As one example of splitting, where the value of N is equal to two, the captured imaging content may be bisected into two imaging portions of either identical or asymmetric size. In some implementations, the captured imaging content may be split up so that a portion of the imaging content is shared between two (or more) of the split up frames. As another example, where the value of N is greater than two, the captured imaging content may be divided into N equal imaging portions or N unequal imaging portions. To illustrate, in one implementation, a 6K image having 6144×3072 pixels may be split into nine equal imaging portions (e.g., a 3×3 grid of 2048×1024 pixels). In another implementation, the 6K image may be split into nine unequal imaging portions (e.g., a single 4K image (4096×2048) and five (5) 2K images (2048×1024 pixels)). The present disclosure contemplates in one implementation splitting which is consistent with the desired aim of utilization of the HEVC 5.2 codec and its constraints while enabling a full 360° image (having 1080p 120° views) to be obtained.

In some devices or codecs, exact resolutions may be required. As such, in one variant, the image splitter 620 may add filler pixels (e.g., one or more borders of a single color) to the foregoing image portions. These extra pixels may later be removed during decoding (by e.g., decoders 670A . . . 670N and/or stitch apparatus 680). In another variant, the image splitter 620 may add extrapolated pixels to the foregoing image portions. These extrapolated pixels may later be removed during decoding (by e.g., decoders 670A . . . 670N and/or stitch apparatus 680). Data representative of these extra or extrapolated pixels may be stored in a metadata file, which may be transmitted to the A/V container 640. In another such variant, the image splitter 620 may decimate pixels of the image portions. In a related variant, the image splitter 620 may interpolate pixel values (e.g., collapsing multiple pixel values into a single pixel value). In some such variants, the decimated/interpolated pixels may be recovered during decoding (by e.g., decoders 670A . . . 670N and/or stitch apparatus 680) based on data stored in a metadata file. These and other variants will be discussed in subsequent detail herein with regards to the discussion of FIGS. 7A-7B discussed infra.

The split up imaging content may then be fed to various respective encoders (e.g., 'encoder 1' 630A . . . 'encoder N' 630N, and/or other encoders). For example, in some implementations, the encoders may include H.264 video encoders and the number of encoder instances is two. As a brief aside, many common computing devices may support one or more types of encoders/decoders (such as H.265/MPEG-H HEVC; H.264/MPEG-4 AVC; H.263/MPEG-4 Part 2; H.262/MPEG-2; Microsoft® encoders; Google® encoders and/or various other types of encoders). However, it has been found by the Assignee of the present application that although many of these types of encoders/decoders have limitations with regards to resolution and bit rate, often times these common computing devices may support multiple instances of the same encoder/decoder. In other words, these common computing devices may be "tricked" into encoding/decoding respective portions of, for example, natively captured video content of a higher resolution and/or a higher bit rate, such that each of these respective portions complies with the encoding parameter constraints associated with the underlying codecs supported by these computing devices.

The output of these encoders 630A . . . 630N may be coupled and fed into one or more audio/visual (A/V) container logic 640. For example, the A/V container logic 640 may include logic to contain, using an MP4 container format, the multiple instances output from respective encoders 630A . . . 630N. These may be stored within respective tracks contained within a single MP4 container. In some implementations, the output from respective encoders 630A . . . 630N may be fed into two or more MP4 containers (e.g., into single track MP4 containers, into multiple dual track MP4 containers, and/or into multiple multi-track MP4 containers, etc.). The output of these A/V container logic 640 may then be transmitted and stored into a storage apparatus (e.g., a hard drive or other types of memory) and/or may be transmitted across an interface (such as a network interface over, for example, the Internet). In one embodiment, the outputted encoded images may be fed into the A/V container logic separately, i.e., one at a time. One or more of these A/V container logic may also include respective metadata which may be utilized in order to, inter alia, facilitate rendering of the high resolution imaging content which is described at, for example, FIG. 6B (which may include splitting of imaging content retrieved from the A/V container to enable, e.g., opening of the required number of decoder instances, and feeding of imaging content to respective decoder instances). The aforementioned image splitter 620, encoders 630A . . . 630N, and A/V container logic 640 may be implemented through the use of a computer program containing computer-readable instructions that may be executed by one or more processing units. These computer-readable instructions may be stored in a computer-readable apparatus (e.g., memory). In some implementations, one or more of the aforementioned image splitter 620, encoders 630A . . . 630N, and A/V container logic 640 may be implemented through dedicated hardware components (e.g., one or more integrated circuits).

Figure 7B:
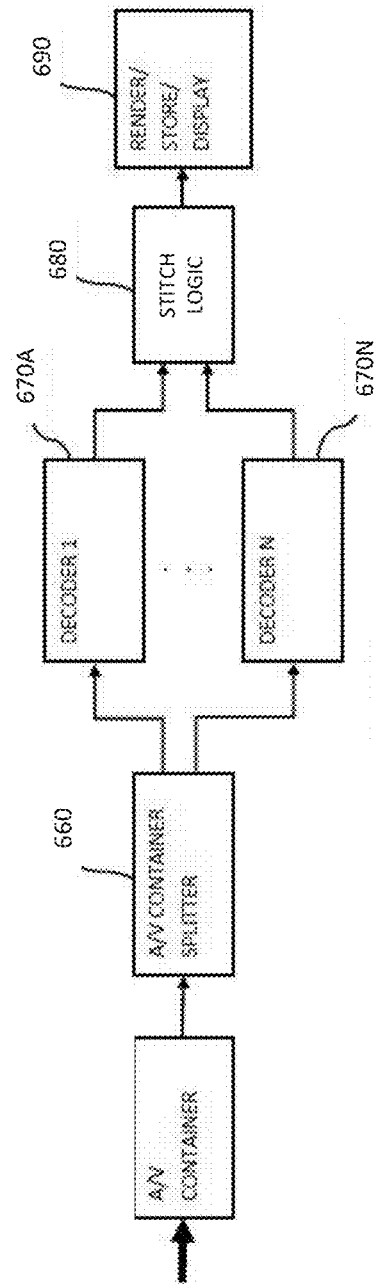
FIG. 7B illustrates a system for rendering high resolution imaging content received from the system of FIG. 7A in accordance with some implementations.

Referring now to FIG. 7B, a system 650 for the rendering of high resolution imaging content is shown and described in detail. The output of the A/V container logic 640, such as the A/V container(s) output from system 600, may be received/retrieved by system 650. These A/V container(s) may be coupled to an A/V container splitter (decode-side) 160. In some implementations, the A/V container splitter 660 may be embodied within the Quik™ software/computer program application manufactured by the Assignee hereof. In some implementations, the A/V container splitter 660 may read metadata information contained within the A/V container(s) 640 so as to enable the A/V container splitter 660 to, for example, open up the required number of instances of the decoders 670A . . . 670N as well as to properly partition out the imaging portions contained within the A/V container(s) 640 so that these imaging portions may be properly decoded. In another example, the A/V container splitter 660 may allocate/enable the required number of hardware decoders 670A . . . 670N.

Related to the splitting of the captured imaging content described above, in one variant, the number of instances of the decoders may correspond to the value of N. For example, where the captured imaging content was split into N imaging portions, the number of decoders may be N such that each decoder decodes its corresponding imaging portion. In another variant, the number of decoders may be different from the value of N. In some cases, a given decoder may be able to decode more than one of the N imaging portions. Hence, in some cases, for example, two relatively smaller imaging portions may be transmitted to one decoder, while one larger imaging portion may be transmitted to a second decoder. The A/V container splitter 660 may determine different allocations by taking into account capabilities associated with each individual decoder before allocating or assigning a decoder to an imaging portion. In some implementations, a given decoder may be a software-based logical function or module of a hardware decoder, and thus, decoder 672, for example, may have a plurality of distinct decoder functions that may each receive, e.g., a relatively smaller imaging portion discussed above. In some implementations, the opening of additional instances of the decoders may be performed without the underlying knowledge of the user such that the encoding/decoding of this high resolution imaging content may occur seamlessly.

In some embodiments, data related to pixel modifications may be read from, e.g., a metadata file received at the A/V container logic 640. In one such variant, the decoding may add back decimated/interpolated pixels and/or remove extra pixels or extrapolated pixels based on the metadata file that was generated during image splitting by the image splitter 620 (or during encoding by encoders 630A . . . 630N).

In some implementations, the metadata information (included in or separate from the aforementioned metadata file) may include timestamp information for respective imaging portions so as to enable these imaging portions to be recognized and recombined appropriately by, for example, stitch apparatus 680. Respective imaging portions may be fed to a corresponding decoder instances 670A . . . 670N. For example, in the context of a two-track MP4 container, track one may be fed to a first decoder, while track two may be fed to a second decoder. These and other variants would be readily apparent to one of ordinary skill given the contents of the present disclosure.

The output of decoders 670A . . . 670N may be fed to a stitch apparatus 680. The stitch apparatus 680 may recombine the decoded image portions from the decoders 670A . . . 670N. In some implementations, the stitching algorithm for the stitch apparatus 680 may be simplified and may recombine the decoded image portions based on metadata information contained within the A/V container logic 640. For example, the stitching may be performed by a fragment shader by reorienting the decoded image portions. Accordingly, as the decoded image portions may be perfectly "cut", no higher level "stitching" is required, rather the decoded image portions may be aligned via pixel alignment in, for example, a graphic processing units' (GPU) fragment shader. In this manner, stitching operations from the stitch apparatus 680 may be substantially simplified allowing for, for example, the recombined decoded images to be output in real-time (or near real-time) to the render/ store/display apparatus 690. The render/store/display apparatus 690 may, for example, pass on the entirety of the decoded image to a storage apparatus (e.g., a hard drive or other types of memory) where the entirety of the decoded image is displayed to a user. In some implementations, the render/store/display apparatus 690 may render the entirety of the decoded image and may re-render the entirety of the decoded image to a smaller resolution if desired (e.g., for display on a display device). The aforementioned A/V container logic 640, A/V container splitter 660, decoders 670A . . . 670N and stitch apparatus 680 may be implemented through the use of a computer program containing computer-readable instructions that may be executed by one or more processing units. These computer-readable instructions may be stored in a computer-readable apparatus (e.g., memory). In some implementations, one or more of the aforementioned A/V container 640, A/V container splitter 660, decoders 670A . . . 670N and stitch apparatus 680 may be implemented through dedicated hardware components (e.g., one or more integrated circuits).

Referring now to FIG. 8A, one exemplary system 700 for the capture and encoding of high resolution imaging content is shown. In one exemplary embodiment, the system includes a Janus-type camera that includes a front fisheye camera device 710A and a back fisheye camera device 710B. The front and back camera devices 710A, 710B each capture a greater than 180° fisheye image (thereby resulting in an overlapping "seam" region). Other embodiments may use a greater or fewer number of capture devices (e.g., a 1-camera device, 3-camera device, a 4-camera device, 6 camera device, etc.) The resulting images may be directly stitched/ mapped by the image signal processor (ISP) 715 into an unequal area projection (e.g., UAC projection) representing a 360° spherical image. The mapping may require some amount of interpolation of pixel values to "stretch" the images onto facets of a "cubemap". For example, mapping may require stretching and/or shrinking according to ideal geometric and perspective modeling and mathematics. Mapping and interpolation can be further described within metadata such that it can be later reversed, and the original image data can be recovered, if necessary.

In one embodiment, the images captured by the camera devices are first stitched by the ISP 715 into an intermediate 360° spherical projection; and once the spherical projection has been stitched, the ISP can perform UA re-mapping and/or any lossy manipulations if necessary (e.g., decimation, interpolation, padding, extrapolation, etc.). For example, in the illustrated embodiment, the spherical projection is re-mapped into an unequal area cubemap (UAC) projection. Re-mapping from the spherical projection to the UAC can require some amount of interpolation of pixel values to "stretch" the points of a "sphere" into a "cubemap". As described above, re-mapping may require stretching and/or shrinking according to ideal geometric and perspective modelling and mathematics. Re-mapping, interpolation and/or extrapolation can be further described within metadata such that it can be later reversed, and the original stitched image data can be recovered, if necessary.

In one exemplary embodiment, some stitching "in-camera" is performed on RAW image data, thus object motion and/or image parallax can be resolved without artifacts introduced by lossy manipulations. In other words, any motion and/or edge discontinuities within the overlapping areas near the seam can be resolved with the original raw data (as opposed to compression based artifacts that may have been added by lossy manipulations). Co-owned and co-pending U.S. patent application Ser. No. 16/503,320 filed contemporaneously herewith on Jul. 3, 2019 and entitled "APPARATUS AND METHODS FOR PRE-PROCESSING AND STABILIZATION OF CAPTURED IMAGE DATA," {GP2019002} incorporated herein by reference in its entirety, describes exemplary apparatus and methods for in-camera combination and processing that may be used consistent with the present disclosure.

Referring back to FIG. 8A, the partitioned UAC content may be coupled to an image splitter 720. The image splitter 720 may be in signal communication with the image capture devices 710A, 710B via either a wired or wireless network communications link. In one exemplary embodiment, the UAC content can be partitioned into two (2) image segments: a first or "horizontal" image (composed of the left, front, and right faces/facets), and a second or "vertical" image (composed of the top, back, and bottom faces/facets). Artisans of ordinary skill in the related arts will readily appreciate that each of the two (2) image segments represent a contiguous (three (3) facets) subset of the 360° panorama (the 360° panorama having four (4) facets). The contiguous, three-facet subset may be representative of a 360-X degree image, where X is the field of view in degrees represented in the front and back faces of the UAC. In one exemplary embodiment, the front and back facets of the UAC represent 90° views, and the three-facet image segments represent contiguous 270° images. A horizontal 360° panorama can be reconstructed from the horizontal image segments (left, front, and right) as well as a rotated portion of the vertical image segment (i.e., the back face). Grouping the horizontal and vertical image segments in this contiguous fashion ensure that the facets have minimal image discontinuity. Moreover, each of the image segments in the exemplary implementation is 3600×2160 pixels in total size, which is within the capabilities of most commonly available "commodity" codecs such as the HEVC 5.2 (i.e., 4096×2160), and the total 5760 pixels of the F/B/L/R composite stays within the desired hardware encoder logic capabilities. In other words, the organization of cube facets minimizes the undesirable effects of edges and motion that span multiple facets, and the partitioning of cube facets ensures that the images can be easily distributed in existing codec ecosystems, including to enable 1080 P performance across 360 degrees as previously described. In this manner, the overall codec performance can be improved and the resulting image data is minimally affected by lossy compression.

While the illustrated embodiment partitions the stitched UAC content into two (2) image segments, other variants may use a greater number of image segments. For example, the UAC content could be split into three (3) pairs of contiguous facets e.g., a top-back pair, a front-left pair, and a right-bottom pair. Still other splits may duplicate facets to e.g., present fewer seams in a particular viewing horizon, etc. As another example, the UAC content could be split into two (2) rings of e.g., a top-back-bottom-front ring, and a front-left-back-right ring. Still other variants may be substituted with equal success by artisans of ordinary skill in the related arts, given the contents of the present disclosure.

Moreover, while the illustrated embodiment equally partitions the UAC content into symmetrically sized segments (e.g., vertical and horizontal), other configurations may use different partitioning schemes. For example, the captured imaging content may be bisected into two imaging portions of either identical or asymmetric size. In some implementations, the captured imaging content may be split up so that a portion of the imaging content is shared between two (or more) of the split up frames. UAC segments seek to preserve some amount of the original image information density (the amount of image information represented by each pixel) by providing a greater number of pixels for the central portion of the viewing angle in each camera. In other words, the front and back facets of the cubemap projection have larger areas than the left, right, top, and bottom facets of the cubemap projection for lens polynomials which produce a non-uniform image density function.

After image splitting, the UAC image segments may then be fed to various respective encoders (e.g., UAC encoder 730A, 730B). For example, the UAC encoders may include H.265 video encoders with hardware accelerator logic. As previously discussed, commodity H.265 HEVC hardware-based encoders may have limitations associated therewith (e.g., 5760 pixels), such that exceeding the limits will "kick" the processing over to a software-based encoder, which is highly undesirable. As another example, the UAC encoders may include JPEG video encoders. As a brief aside, many common computing devices may support one or more types of encoders/decoders (such as H.265/MPEG-H HEVC; H.264/MPEG-4 AVC; H.263/MPEG-4 Part 2; H.262/MPEG-2; Microsoft® encoders; Google® encoders and/or various other types of encoders).

Each UAC encoder 730A, 730B may generate one or more encoded audio/visual (A/V) outputs that are then provided to the container logic 740. For example, the A/V container logic 740 may include logic by which the output is contained within an MP4 container format, and the multiple instances output from respective UAC encoders 730A, 730B may be stored within respective tracks contained within a single MP4 container. In some implementations, the output from respective UAC encoders 730A, 730B may be fed into two or more MP4 container structures (e.g., into single track MP4 containers, into multiple dual track MP4 containers, and/or into multiple multi-track MP4 containers, etc.). These A/V container(s) may then be transmitted and stored into a storage apparatus (e.g., a hard drive or other types of memory) and/or may be transmitted across an interface (such as a network interface over, for example, the Internet). In one embodiment, the outputted encoded images may be fed into the A/V container separately, i.e., one at a time. One or more of these A/V container(s) may also include respective metadata which may be utilized in order to, inter alia, facilitate rendering of the high resolution imaging content. The aforementioned image splitter 720, ISP 715, UAC encoders 730A, 730B, and A/V container logic 740 may be implemented through the use of a computer program containing computer-readable instructions that may be executed by one or more processing units. These computer-readable instructions may be stored in a computer-readable apparatus (e.g., memory). In some implementations, one or more of the aforementioned image splitter 720, ISP 715, UAC encoders 730A, 730B, and A/V container logic 740 may be implemented through dedicated hardware components (e.g., one or more integrated circuits).

Referring now to FIG. 8B, a system 750 for the rendering of high resolution imaging content is shown and described in detail. The A/V container(s), such as the A/V container(s) output from system 700, may be received or retrieved by system 750. These A/V container(s) may be coupled to an A/V container splitter (decode-side) 760. In some implementations, the A/V container splitter 760 may read metadata information contained within the A/V container(s) so as to enable the A/V container splitter 760 to, for example, configure the UAC decoders 770A, 770B, as well as to properly partition out the imaging portions contained within the A/V container(s) so that these imaging portions may be properly decoded.

In reference to FIGS. 8A and 8B, and as previously noted, properly sized imaging content (e.g., UAC projections that have been divided into two portions by the image splitter 720 or A/V container splitter 760, where each portion has a resolution of 3600×2160) would allow a typical level 5.2 encoder or decoder to handle each of the portions. Advantageously, encoded UAC projections may be split at the seam that separates each projection, i.e., one projection having left, front, and right faces, and another projection having top, back, and bottom faces. The natural division at the seam greatly reduces bit errors as well as file size arising from high-frequency computations at high-variation spaces (e.g., color space) that are difficult to compress.

Notably, in the exemplary embodiments, the UAC facets are not all equal in size. In one variation, the front and back facets may measure 2160×2160 pixels, while the left, right, top, and bottom facets may measure 720×2160 pixels. Four faces together results in an image (e.g., panorama) of 5760 in width (5760×2160). A panoramic width of 5760 pixels is able to provide a resolution of 1080p when viewed in any direction as well as being within the capabilities of prevailing HEVC 5.2 hardware-based codecs. Hence, a panoramic image (having a width of 5760 pixels) resulting from the aforementioned UAC encode and decode would retain a satisfactory image quality for a user. That being said, other splits/values for the facets may be used, as previously discussed. A 1440P (2560×1440) based value may be selected for example, such as where the front and back panels are 2560×1440, and the left/right/top/bottom panels are each 320×1440. As such, the parameters of the non-uniform scaling may be selected based on particular characteristics of the sensors, such as where the "rolloff" of the image information density function is very sharp towards the edges of the FOV(s).

Moreover, the UAC configuration may be selected to optimize (i) image information density when considered in 360 degrees), and possibly (ii) support by a desired target codec version (e.g., HEVC 5.2 which cannot exceed 4096× 2160 for any given panel).

Returning to FIG. 8B, the illustrated A/V container splitter 760 splits the A/V container equally for the UAC decoders 770A, 770B, however other configurations may use different partitioning schemes of either identical or asymmetric size. In some implementations, the captured imaging content may be split up so that a portion of the imaging content is shared between two (or more) of the split up frames. In some implementations, the metadata information (included in or separate from any metadata file containing data related to the added pixels) may include timestamp information for respective imaging portions so as to enable these imaging portions to be recognized and recombined appropriately by, for example, the stitch logic 780. Respective imaging portions may be fed to a corresponding UAC decoder instance 770A, 770B. For example, in the context of a two-track MP4 container, track one may be fed to decoder 770A, while track two may be fed to decoder 770B. These and other variants would be readily apparent to one of ordinary skill given the contents of the present disclosure.

The output of UAC decoders 770A, 770B may be fed to the stitch logic 780 (e.g., fast stitch logic in one embodiment). The fast stitch logic 780 may recombine the decoded image portions from the UAC decoders 770A, 770B. In one exemplary implementation, the stitching algorithm for the stitch logic 780 may be simplified and may recombine the decoded image portions based on metadata information contained within the A/V container(s). For example, the stitching may be performed by a fragment shader by reorienting the decoded image portions. Accordingly, as the decoded image portions may be perfectly "cut", no higher level "stitching" is required, rather the decoded image portions may be aligned via pixel alignment in, for example, a graphic processing units' (GPU) fragment shader. In this manner, stitching operations from the stitch logic 780 may be substantially simplified allowing for, for example, the recombined decoded images to be output in real-time (or near real-time) to the render/store/display apparatus 790. The render/store/display apparatus 790 may, for example, pass on the entirety of the decoded image to a display device where the entirety of the decoded image is displayed to a user. In some implementations, the render/store/display apparatus 790 may render the entirety of the decoded image and may re-render the entirety of the decoded image to a smaller resolution if desired (e.g., for display on a display device). The aforementioned A/V container 740, A/V container splitter 760, UAC decoders 770A, 770B and stitch logic 780 may be implemented through the use of a computer program containing computer-readable instructions that may be executed by one or more processing units. These computer-readable instructions may be stored in a computer-readable apparatus (e.g., memory). In some implementations, one or more of the aforementioned A/V container 740, A/V container splitter 760, UAC decoders 770A, 770B and stitch logic 780 may be implemented through dedicated hardware components (e.g., one or more integrated circuits).

In some embodiments, the system 700 and the system 750 may be located and/or performed at different entities. For example, the system 700 (including capture device 710, image splitter 720, ISP 715, UAC encoders 730A/730B, and/or A/V container logic 740) may be located on a single device (e.g., capturing device such as a camera, mobile user device, graphics engine). The system 750 (including A/V container splitter 760, UAC decoders 770A, 770B, stitch apparatus/logic 780, and/or render/store/display apparatus 790) may be located on a different device (e.g., mobile user device, storage device, graphics engine, PC, laptop, server, cloud entity, etc.) that is separate from the abovementioned device.

Exemplary Architecture—

Figure 9:
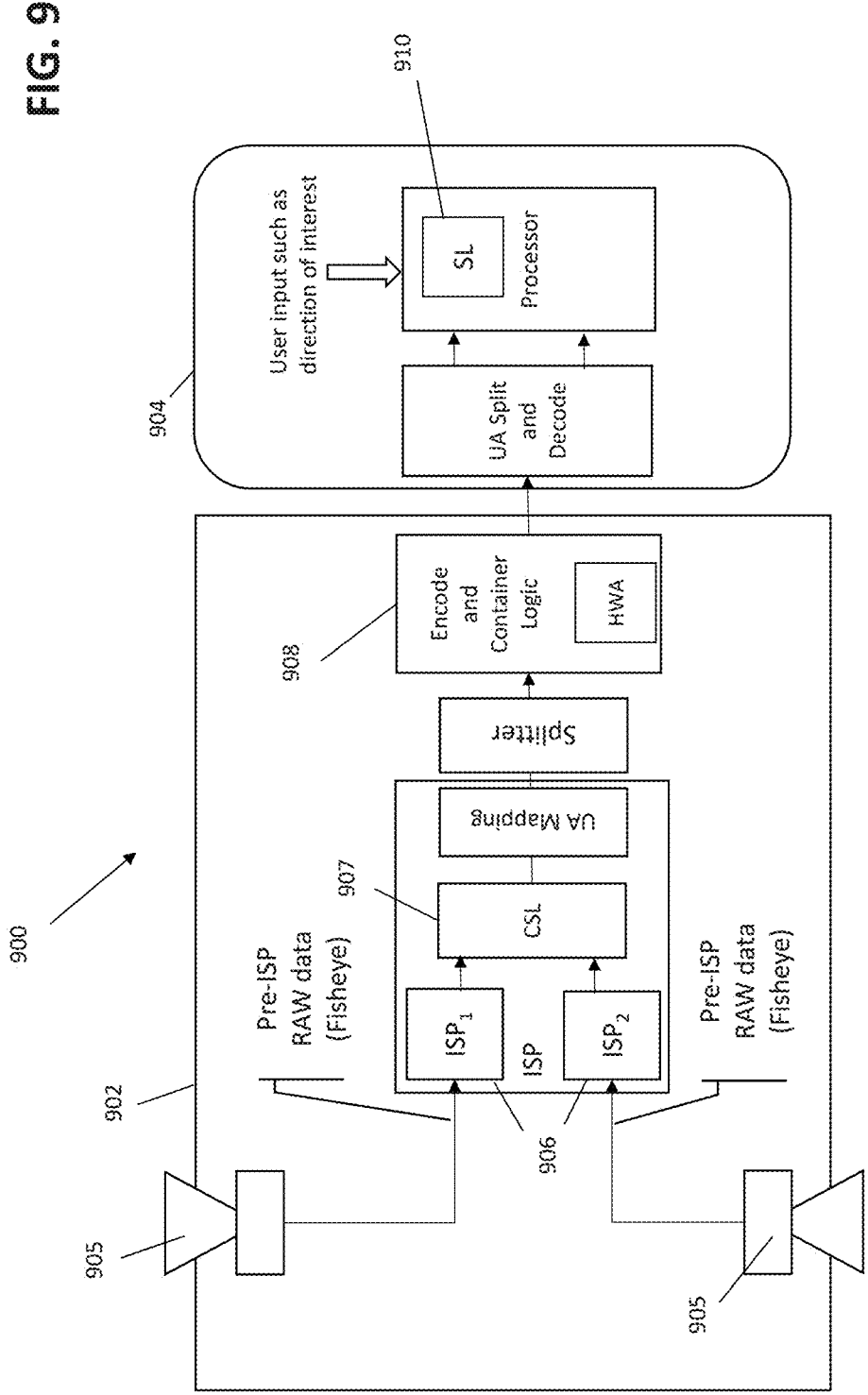
FIG. 9 illustrates a system architecture for rendering high resolution imaging content in accordance with some implementations.

Referring now to FIG. 9, one embodiment of an image data processing architecture according to the present disclosure is shown and described. It will be appreciated that this architecture 900 may utilize one or more of the apparatus 700, 750 described above with respect to FIGS. 7A-8B, portions thereof, or yet other apparatus, the apparatus of FIGS. 7A-8B being merely exemplary.

As shown in FIG. 9, the architecture 900 includes one or more capture devices 902, and one or more recipient or target devices 904. The devices are in data communication with each other, e.g., transiently via a wired or wireless link such as USB, BLE, Wi-Fi, 3GPP (4G/4.5G/5G), NB-IoT, IEEE Std. 802.15.4, or other. In this embodiment, the capture device (e.g., camera) 902 includes two spherical or fisheye lenses and associated image sensors 905, which generate RAW image data. The two sensors each capture a picture natively using a fisheye camera (e.g., 3.25K/a information density). The supporting ISPs 906 each generate image data that are ultimately used by the hardware accelerator (HWA) of the encoder logic 908 to create UA images (e.g., Unequal Area Cubics or UACs) rather than fisheye images. The coarse stitch logic (CSL) 907 takes the images generated by the ISPs 906 and stitches them together for subsequent processing by the UA mapping engine 911 and splitter 913 and encoder logic 908. In an alternate embodiment, the CSL 907 may be bypassed. The UA mapping engine may accept image data directly from the ISPs and map/stitch the image data onto a UA projection.

As previously noted, UA (e.g., UAC) mapping techniques preserve most of (but not all) of the fisheye sensor information density. In exemplary embodiments, the minor loss in information density is offset by, inter alia, the fact that UAC can be handled with broadly deployed and comparatively inexpensive ecosystem utilizing hardware-based image data compression.

The compressed UAC image data is ultimately containerized (e.g., within one or more MP4 containers as previously described) and transmitted over the data link, and received at the recipient/target device 904 where it is de-containerized, split and decoded as shown in FIG. 9. The target platform host processor includes in one embodiment stitching logic (SL) 910 which allows the stitched images to be formed, in one variant, based on direction of interest. It may also or alternatively only be performed on the specific area that needs to be stitched (e.g., not the entire 360°).

When stitching source images from the two (2) fields of view of the fisheye lenses (FIG. 3) together, the stitching logic algorithms should ideally reconcile at least any salient differences between the two (2) source images. For example, objects present within one of overlapping regions 132, 134 will appear slightly different between the two (2) source images due to parallax effects. As used herein, the term "parallax" refers without limitation to a displacement or difference in the apparent position of an object viewed along different lines of sight. Parallax can be mathematically expressed or described with the angle or semi-angle of inclination between the lines of sight. As used herein, the term "perspective" refers to a warping or difference in the apparent dimensions of an object viewed along a line of sight.

As used herein, the term "redundant" within the context of source images, refers without limitation to pixel information that is found in multiple source images. Redundant information may be introduced by parallax effects and can be reconciled together to generate stitched output information. In contrast, as used herein, the term "singular" within the context of source images, refers without limitation to pixel information that is only found in a single source image. Singular information may be caused by blind spots or other occlusions and cannot be reconciled between images without introducing undesirable artifacts (e.g., translucency, warping, or other undesirable visual effects).

Redundantly captured information can be used in the stitching process to improve stitching. For example, sophisticated stitching techniques may attempt to use parallax information to discern distances and/or evaluate depth of the field of view. Still other techniques may intelligently weight or select (to the exclusion of others) singular pixel information from each field of view. However, simple stitching techniques may not differentiate between redundant and singular information; e.g., simple stitching may use a relatively simple cut-and-feather scheme, averaging scheme, or other unilaterally applied filtering technique.

Exemplary Methods—

Figure 10:
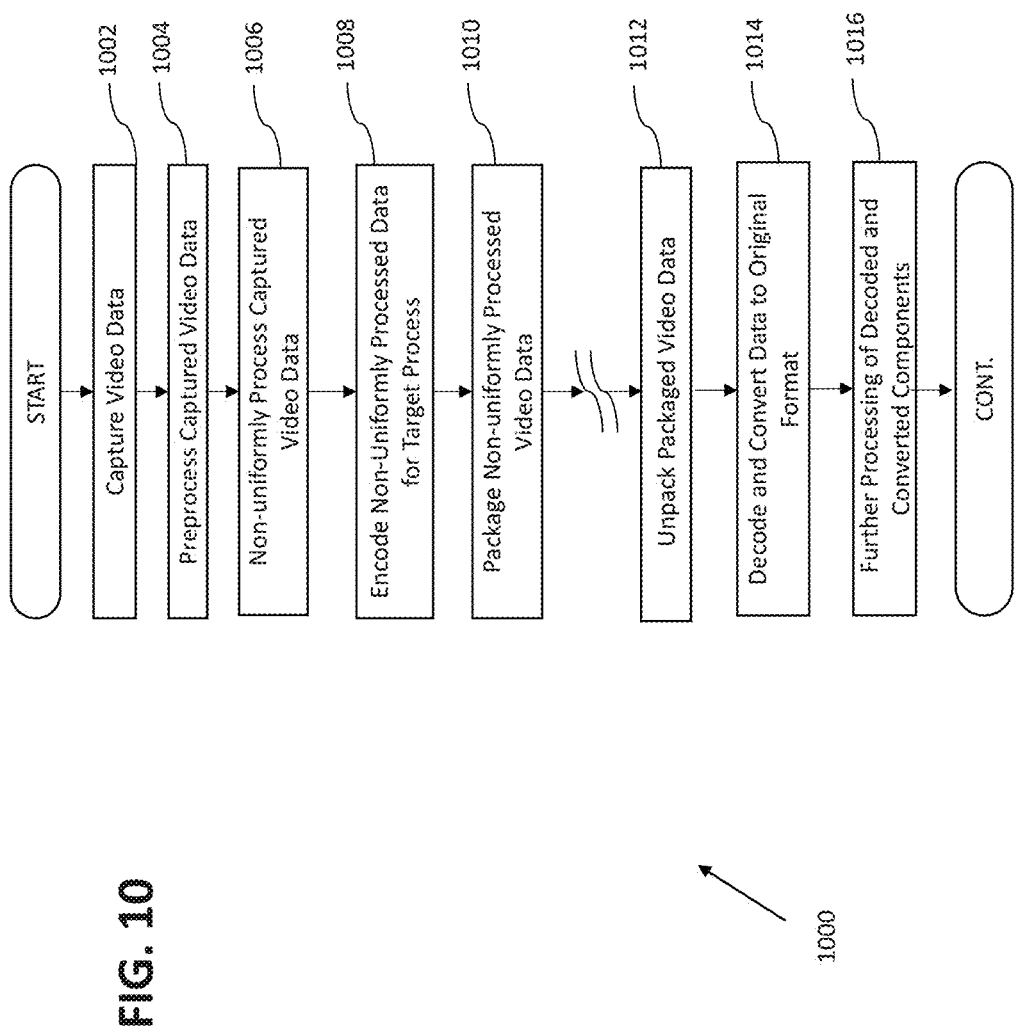
FIG. 10 is a logical flow diagram of one exemplary embodiment of a generalized method for processing captured video data, in accordance with the principles of the present disclosure.

Referring now to FIG. 10, one exemplary generalized methodology 1000 for the processing of image data is shown and described in detail.

At operation 1002, image (video) data is captured by the capture device(s). As previously discussed, in one variant, the image data is formatted as RAW data as generated by the sensor and associated ISP process 715 (FIG. 8B) or the capture devices 710A/710B, although other formats may be used consistent with the present disclosure.

Next, per operation 1004, the captured video data is preprocessed by the capture device (e.g., by the ISPs and/or other dedicated processors/cores of the apparatus). In one embodiment, this preprocessing includes (i) combination of two or more sets of image data corresponding to the same temporal period, and (ii) subsequent stabilization of the combined data structure(s) generated by the combination process. In one embodiment, the stabilization process includes application of one or more algorithms by the ISPs or other processing of the capture platform to compensate for motion or movement.

Next, per operation 1006, the pre-processed image data is then non-uniformly processed, such as by mapping from a first domain of frame of reference (e.g., spherical) to a non-uniform model, such as UAC. Such mapping may include non-uniform scaling of the type previously described. It will be appreciated that any number of different non-uniform scaling paradigms or bases may be used consistent with the method 1000. For instance, in one specific variant, the captured pixels are scaled based on one or more transfer considerations, such as the transfer formats used by the capture device (e.g., UAC). Other examples of transfer considerations may include e.g., available bandwidth over the data link, power consumption, display timing (isochronous), etc.

It will also be appreciated that embodiments of the disclosure may be realized which do not operate on the assumption that pixels associated with the image data will only be "displayed." The aforementioned data transfer-based considerations are in fact only one of many possible useful applications for the captured image data, and as such, other considerations may be used in the selection of the appropriate scaling model. Other useful applications may include for instance (i) post-processing manipulations (such as stitching, domain conversion, etc.), and data analysis (e.g., in the context of artificial intelligence). Hence, the scaling and mapping procedure may be configured to optimize based on one or more of such considerations.

The operation 1006 may also include splitting of the e.g., UAC mapped data into portions as previously described.

Next, per operation 1008 of the method 1000, the pre-processed (e.g., combined, stabilized) scaled/mapped, and split image data is then encoded to the target codec (e.g., HEVC Level 5.2) by the encoding logic/processes 730 of the capture platform. Such encoding may include for example motion estimation, quantization, DCT, as well as other processes, depending on the identity of the target codec.

Per operation 1010, the encoded data portions are packaged (e.g., into one or more A/V containers) and transmitted to the recipient device. The transmitted containers may also include appended data such as metadata for recovery of the spherical mapping as applicable.

Per operation 1012, the recipient or target platform receives the A/V containers and unpacks the packaged (e.g., containerized) encoded data and any ancillary data. The encoded unpacked data may also be split into multiple portions as previously described.

Per operation 1014, the recipient device decodes the encoded video data portions according to the target codec format (e.g., HVEC 5.2), and converts the data back to its original format (e.g., to a spherical frame of reference).

Lastly, per operation 1016, the decoded and converted video data is processed according to the utilizing process. In one embodiment, the utilizing process is one which is configured to perform additional processing steps on the encoded video data to further enhance its quality, FOV, stability, or achieve other desired results. Such processing may include edge or feature detection, combination (e.g., stitching), filtering, color adjustment/enhancement, rotation, stabilization, and/or any number of other operations.

Figure 10A:
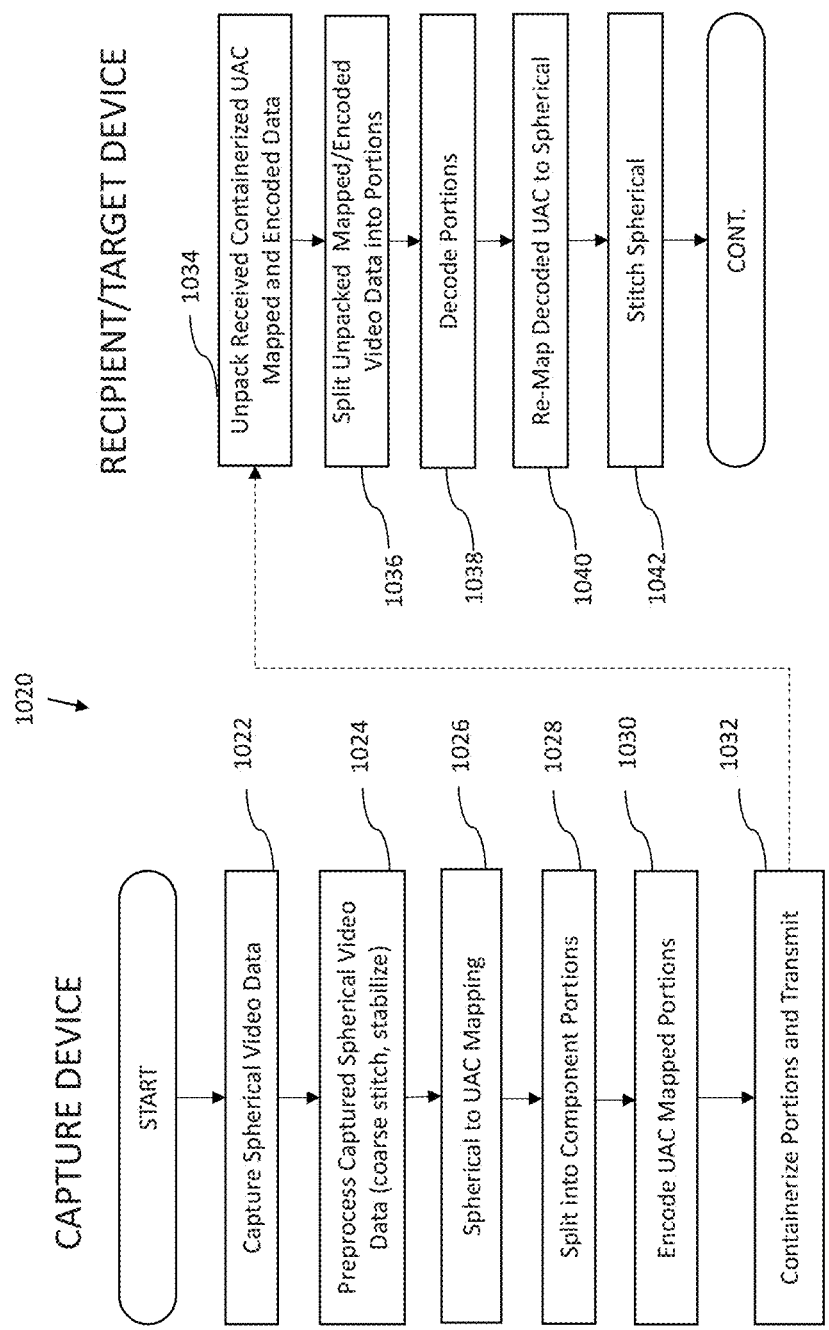
FIG. 10A is a logical flow diagram of one exemplary implementation of the generalized method for processing captured video data of FIG. 10.

Referring now to FIG. 10A, one exemplary implementation 1020 of the generalized methodology 1000 for the processing of image data is shown and described in detail. At operation 1022, image (video) data is captured by the capture device(s); here, two spherical or fisheye capture devices. As previously discussed, in one variant, the image data is formatted as RAW data as generated by the sensor and associated ISP process 715 (FIG. 8B) or the capture devices 710A/710B, although other formats may be used consistent with the present disclosure.

Next, per operation 1024, the captured spherical video data is preprocessed by the capture device (e.g., by the ISPs and/or other dedicated processors/cores of the apparatus). In one embodiment, this preprocessing includes (i) combination of two or more sets of spherical image data corresponding to the same temporal period via a coarse stitch operation, and (ii) subsequent stabilization of the combined data structure(s) generated by the combination process. In one embodiment, the stabilization process includes application of one or more algorithms by the ISPs or other processing of the capture platform to compensate for motion or movement.

Next, per operation 1026, the pre-processed image data is then non-uniformly processed, such as by mapping from spherical to a UAC. Such mapping may include non-uniform scaling of the type previously described, such as to a 3600×2160 UAC format as shown in FIG. 6B.

The operation 1028 in this embodiment includes splitting of the UAC mapped data into portions corresponding to the vertical and horizontal image segments as previously described.

Next, per operation 1030 of the method 1020, the combined, stabilized, scaled/mapped, and split image data is then encoded to the target codec (e.g., HEVC Level 5.2) by the encoding logic/processes 730 of the capture platform. Such encoding may include for example motion estimation, quantization, DCT, as well as other processes, depending on the identity of the target codec.

Per operation 1032, the encoded data portions are packaged (e.g., into one or more A/V containers) and transmitted to the recipient device. The transmitted containers may also include appended data such as metadata for recovery of the spherical mapping as applicable.

Per operation 1034, the recipient or target platform receives the A/V containers and unpacks the packaged (e.g., containerized) mapped and encoded data and any ancillary data. The encoded unpacked data is also then split into multiple portions as previously described per operation 1036.

Per operation 1038, the recipient device decodes the encoded video data portions according to the target codec format (e.g., HVEC 5.2), and converts the data back to its original spherical system or frame of reference per operation 1040.

Lastly, per operation 1042, the decoded and converted video data in spherical format (e.g., the respective fisheye images) is stitched together using the recipient platform. The final rendered image is altered from one not using the UAC processing in that, inter alia, the image density over the image is varied differently due to the non-uniform scaling applied by the capture device.

Additional Configuration Considerations—

Throughout this specification, some embodiments have used the expressions

"comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Javan™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A camera apparatus, comprising:
a plurality of image capture components;
one or more encoding logic;
a data interface;
an image signal processor in data communication with the plurality of image capture components; and
a non-transitory computer readable medium in data communication with the image signal processor, the medium comprising one or more instructions configured to, when executed by the image signal processor, cause the camera apparatus to:
cause the plurality of image capture components to capture a plurality of images;
stitch the plurality of images into a spherical projection;
map the spherical projection into a second projection using at least one non-uniform mapping algorithm;
split the second projection into a plurality of image segments;
encode each of the plurality of image segments via the one or more encoding logic to produce output data having an encoded format;
insert the output data into one or more data containers; and
transmit the one or more data containers via the data interface.

2. The camera apparatus of claim 1, wherein the plurality of image capture components comprise a first fisheye lens camera and a second fisheye lens camera, the first and second fisheye lens camera arranged in a Janus-type configuration.

3. The camera apparatus of claim 2, wherein the map of the spherical projection into a second projection using at least one non-uniform mapping algorithm comprises a map into an unequal area cubic (UAC) projection, the UAC projection characterized by six facets, and wherein at least a portion of the facets are heterogeneous in terms of area.

4. The camera apparatus of claim 1, wherein the one or more encoding logic comprises High Efficiency Video Coding (HEVC) codec logic supporting images not exceeding 4096 pixels in width and 2160 pixels in height.

5. The camera apparatus of claim 1, wherein the High Efficiency Video Coding (HEVC) codec logic supporting images not exceeding 4096 pixels in width and 2160 pixels in height comprises a hardware-based encoder.

6. The camera apparatus of claim 5, wherein each of the two image segments comprises a contiguous 270° image.

7. The camera apparatus of claim 1, wherein the plurality of image segments comprise two image segments each of 3600 pixels in width and 2160 pixels in height.

8. A method for storing and/or transmitting image content, the method comprising:
capturing a plurality of fisheye images via one or more image capture apparatus;
generating an unequal area cubemap (UAC) projection from the plurality of fisheye images, the UAC projection comprising (i) a plurality of first portions associated with a first image resolution, and (ii) a plurality of second portions associated with a second image resolution, the second image resolution being different from the first image resolution, wherein the generating of the UAC projection comprises stitching the plurality of fisheye images into a spherical projection, the spherical projection sub-divided into portions corresponding to different parts of the fisheye images;
encoding the UAC projection into a plurality of encoded data containers; and
causing transmission of the plurality of encoded data containers.

9. The method of claim 8, wherein:
the portions of the spherical projection comprise front, back, left, right, top, and bottom portions; and
the method further comprises:
generating the front and back portions of the spherical projection using first portions of the fisheye images, the first portions of the fisheye images comprising a first resolution density; and
generating the left, right, top, and bottom portions of the spherical projection using second portions of the fisheye images, the second portions of the fisheye images comprising a second resolution density, and
the first portions of the fisheye images each have a higher resolution than each of the second portions of the fisheye images.

10. The method of claim 9, wherein the first portions correspond to first image information density portions of the fisheye images, and the second portions correspond to second image information density portions of the fisheye images, the second image information density portions having image information density portions having a value that is less than that associated with all of the first image information density portions.

11. The method of claim 9, wherein:
the generating of the UAC projection comprises mapping the front, back, left, right, top, and bottom portions of the spherical projection into respective front, back, left, right, top, and bottom facets of the UAC projection; and
neither of the front and back facets of the UAC projection are equal in area to any of the left, right, top, and bottom facets of the UAC projection.

12. The method of claim 11, wherein:
the front and back facets of the UAC projection have identical pixel dimensions of width w1 and height h1
the left, right, top, and bottom facets have identical pixel dimensions of w2 and height h2; and
w1 is greater than w2.

13. The method of claim 11, wherein the mapping of the portions of the spherical projection into the respective facets of the UAC projection comprises using a lossy mathematical transform which is reversible in terms of loss.

14. The method of claim 11, further comprising splitting the UAC projection into a plurality of image segments by at least:
generating a first image segment from a first subset of the front, back, left, right, top, and bottom facets of the UAC projection; and
generating a second image segment from a second subset of the front, back, left, right, top, and bottom facets of the UAC projection, second subset being different from the first subset, the first and second image segments having none of the same ones of the front, back, left, right, top, and bottom facets.

15. The method of claim 14, wherein the first image segment comprises the left, the front, and the right facets of the UAC projection, and the second image segment comprises the top, the back, and the bottom facets of the UAC projection.

16. The method of claim 8, wherein the stitching of the plurality of fisheye images into the spherical projection further comprises (i) using a lossy mathematical algorithm, and (ii) generating a stitching metadata file, the stitching metadata file comprising recovery data useful in recovering at least a portion of data lost via application of the lossy mathematical algorithm.

17. The method of claim 8, wherein the UAC projection comprises a first image segment and a second image segment, each of the first and second image segments comprising one of the plurality of first portions associated with the first image resolution and two of the plurality of second portions associated with the second image resolution.

18. A method for processing image content, the method comprising:
    capturing a plurality of fisheye images via one or more image capture apparatus;
    generating an unequal area projection from the plurality of fisheye images, the unequal area projection comprising (i) at least one first portion associated with a first image resolution and (ii) at least one second portion associated with a second image resolution, the generating of the unequal area projection comprising generating a rotated spherical projection (RSP), the generating of the RSP comprising stitching the plurality of fisheye images into a spherical projection, the spherical projection sub-divided into portions corresponding to different parts of the fisheye images;
    encoding the RSP into a plurality of encoded data containers; and
    causing transmission of the plurality of encoded data containers.

19. The method of claim 18, further comprising:
    generating a first set of portions of the spherical projection based at least on a first set of portions of the fisheye images, the first set of portions of the fisheye images associated with a first resolution density; and
    generating a second set of portions of the spherical projection based at least on a second set of portions of the fisheye images, the second set of portions of the fisheye images associated with a second resolution density, the second resolution density being lower than the first resolution density.

20. The method of claim 18, wherein the capturing of the plurality of fisheye images comprises capturing a plurality of hyper-hemispherical images each having a field of view greater than 180 degrees; and
    wherein the method further comprises:
        based on the plurality of hyper-hemispheric images, generating (i) a plurality of hemispherical images and (ii) stitch metadata; and
        generating a spherical projection based at least on the plurality of hemispherical images.

21. The method of claim 20, wherein:
    the generating of the spherical projection comprises stitching the plurality of hemispherical images; and
    the stitch metadata is configured to enable re-stitching of the plurality of hemispherical images.

* * * * *